(12) United States Patent
Saigo et al.

(10) Patent No.: US 8,817,873 B2
(45) Date of Patent: Aug. 26, 2014

(54) IMAGE CODING/RECORDING APPARATUS AND IMAGE CODING/RECORDING METHOD

(75) Inventors: Katsuo Saigo, Hyogo (JP); Hiroshi Arakawa, Nara (JP)

(73) Assignee: Panasonic Corporation, Osaka (JP)

( * ) Notice: Subject to any disclaimer, the term of this patent is extended or adjusted under 35 U.S.C. 154(b) by 1998 days.

(21) Appl. No.: 11/808,217

(22) Filed: Jun. 7, 2007

(65) Prior Publication Data

US 2007/0286280 A1   Dec. 13, 2007

(30) Foreign Application Priority Data

Jun. 9, 2006  (JP) .................................. 2006-161018

(51) Int. Cl.
| | |
|---|---|
| H04N 7/12 | (2006.01) |
| H04N 7/26 | (2006.01) |
| H04N 7/50 | (2006.01) |

(52) U.S. Cl.
CPC ... *H04N 19/00078* (2013.01); *H04N 19/00278* (2013.01); *H04N 19/00187* (2013.01); *H04N 19/00781* (2013.01); *H04N 19/00127* (2013.01); *H04N 19/00193* (2013.01); *H04N 19/0009* (2013.01); *H04N 19/00012* (2013.01); *H04N 19/00266* (2013.01)
USPC .................. 375/240.12; 375/240.26; 382/233

(58) Field of Classification Search
CPC .................. H04N 19/00127; H04N 19/00078; H04N 19/0009; H04N 19/00012; H04N 19/000187; H04N 19/00781; H04N 19/00193; H04N 19/00278; H04N 19/00266
USPC ............ 375/240.01–240.16, 240.26; 382/233
See application file for complete search history.

(56) References Cited

U.S. PATENT DOCUMENTS 6,097,877 A * 8/2000 Katayama et al. ............. 386/314
6,256,344 B1 * 7/2001 Niihara ......................... 375/240

(Continued)

FOREIGN PATENT DOCUMENTS

| | | |
|---|---|---|
| CN | 1653542 | 8/2005 |
| JP | 9-84019 | 3/1997 |

(Continued)

OTHER PUBLICATIONS

ITU-T Recommendation H.264, "*Advanced Video Coding for Generic Audiovisual Services*", Mar. 2005, pp. 8 and 17-19.

(Continued)

*Primary Examiner* — Saleh Najjar
*Assistant Examiner* — Peiliang Pan
(74) *Attorney, Agent, or Firm* — Wenderoth, Lind & Ponack, L.L.P.

(57) ABSTRACT

The invention provides an image coding/recording apparatus which can solve problems of large processing loads due to the real-time re-coding and problems of complicated controls and circuits for returning processing. The image coding/recording apparatus according to an aspect of the invention codes and records image data. The image coding/recording apparatus includes: a coding unit operable to code the image data; a recording unit operable to record the coded data; and a re-coding control unit operable to (i) control said coding unit to re-code the coded data recorded by said recording unit and does not satisfy a predetermined condition, so that the re-coded data satisfies the predetermined condition, and (ii) control said recording unit to record the re-coded data, so that the re-coded data and non-re-coded data are reproduced consecutively.

19 Claims, 23 Drawing Sheets

(56) References Cited

U.S. PATENT DOCUMENTS

| | | | |
|---|---|---|---|
| 6,415,057 B1* | 7/2002 | Suzuki et al. | 382/239 |
| 6,563,549 B1* | 5/2003 | Sethuraman | 348/700 |
| 6,658,157 B1* | 12/2003 | Satoh et al. | 382/239 |
| 6,687,296 B1* | 2/2004 | Sato et al. | 375/240.12 |
| 6,688,714 B1* | 2/2004 | Bailleul et al. | 375/240.23 |
| RE40,679 E* | 3/2009 | Oda | 375/240.13 |
| 2003/0194138 A1* | 10/2003 | Osawa et al. | 382/233 |
| 2003/0215011 A1* | 11/2003 | Wang et al. | 375/240.03 |
| 2004/0027393 A1* | 2/2004 | Kato et al. | 345/838 |
| 2005/0249289 A1 | 11/2005 | Yagasaki et al. | |
| 2006/0215044 A1* | 9/2006 | Masuda et al. | 348/224.1 |
| 2007/0025441 A1* | 2/2007 | Ugur et al. | 375/240.03 |
| 2007/0116115 A1* | 5/2007 | Tong et al. | 375/240.03 |

FOREIGN PATENT DOCUMENTS

| | | |
|---|---|---|
| JP | 2000-295567 | 10/2000 |
| JP | 2001-197427 | 7/2001 |
| JP | 2001-197504 | 7/2001 |
| JP | 2003-52010 | 2/2003 |
| JP | 2004-7359 | 1/2004 |
| JP | 2004-135251 | 4/2004 |
| JP | 2005-33599 | 2/2005 |
| JP | 2005-525669 | 8/2005 |
| JP | 3753726 | 3/2006 |
| JP | 2006-295910 | 10/2006 |
| WO | 03/096338 | 11/2003 |
| WO | 2006/045165 | 5/2006 |
| WO | 2006/046165 | 5/2006 |

OTHER PUBLICATIONS

"*White paper Blu-ray Disc Format*", 2.A Logical and Audio Visual Application Format Specifications for BD-RE, Aug. 2004, Internet 2004, Internet URL : http://blu.raydisc.com/assets/downloadable/file/2a_bdre_logicalaudiovisual-12838.pdf.

* cited by examiner

FIG. 15

| | Violation Code | Violation Details | Avoidance Control |
|---|---|---|---|
| Violation | 00 | MB over maximum coding amounts (3200 bits) avoidance | per frame, QP control (large QP) |
| | 01 | CPB underflow avoidance | per frame, QP control (small QP) |
| | 10 | CPB overflow avoidance | per frame, QP control (large QP) |

FIG. 18
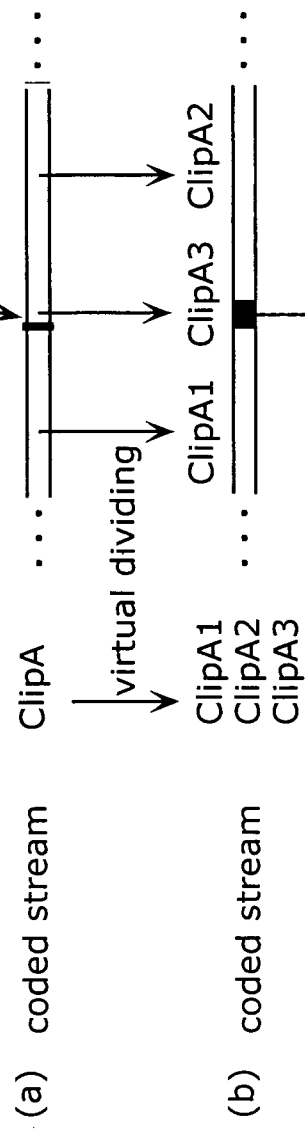
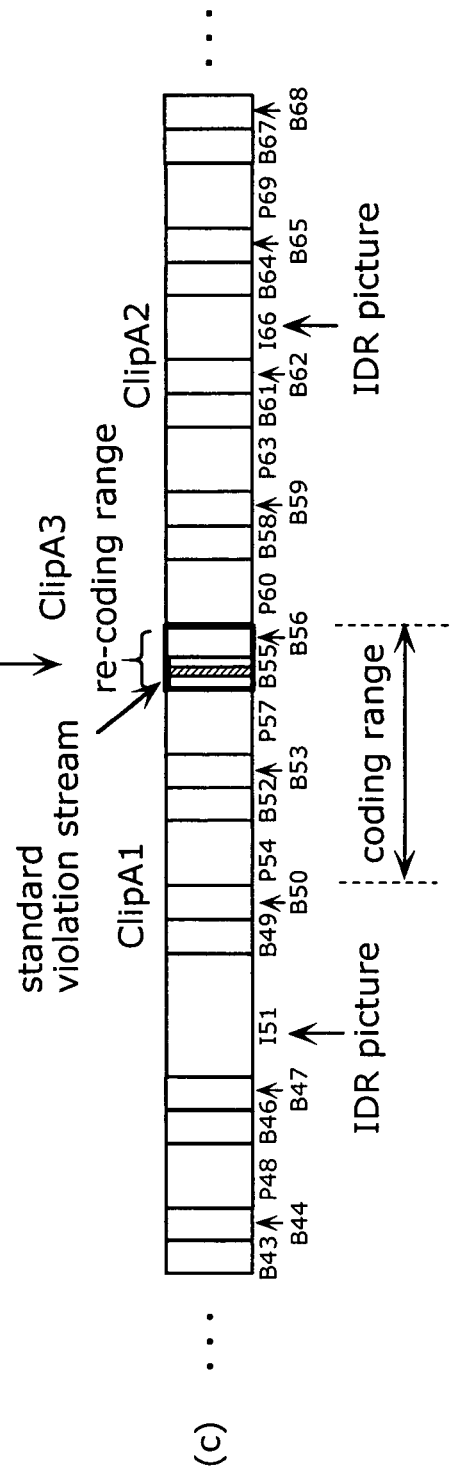

IMAGE CODING/RECORDING APPARATUS AND IMAGE CODING/RECORDING METHOD

BACKGROUND (1) Field of the Invention

The invention relates to an image coding/recording apparatus which codes and records image data, and more particularly to an image coding/recording apparatus which codes image data using H.264 image coding method and records the coded data onto a recording medium.

(2) Description of the Related Art

With the development of digital imaging technologies, data compression technologies have been utilized and developed for digital video data, in order to address increases in the data amount. One example is the development in a data compression technique specialized for image data, which takes advantage of the characteristics of such image data. Moreover, recent improvements in the data processing ability of computers allow complicated computations in compression technologies, so that compression rates of video data have been significantly enhanced. For example, the MPEG-2 standard is one of such compression technologies and is employed in satellite and terrestrial digital high definition (HD) broadcasting.

A further developed image compression technology following the MPEG-2 standard is H.264 standard realizing a compression rate two times higher than the MPEG-2 standard. The H.264 image coding method is the same as the conventional MPEG coding method, since both methods are hybrid image coding methods using orthogonal transformation and motion compensation. However, the H.264 standard has higher flexibility of coding tools of elements for the coding, and the cumulative effects of the coding tools enable high coding efficiency to be realized.

FIG. 1 is a functional block diagram showing an apparatus by which the H.264 image coding is realized (hereinafter, referred to also as an "H.264 image coding apparatus"). As shown in FIG. 1, the H.264 image coding apparatus includes an analog/digital (A/D) converter 11, a picture sorting buffer 12, a macroblock dividing unit 13, a subtraction operation unit 14, an orthogonal transformation unit 15, a quantization unit 16, an entropy coding unit 17, an accumulation buffer 18, an inverse-quantization unit 19, an inverse orthogonal transformation unit 20, an addition operation unit 21, a picture memory 22, an intra-picture (intra-frame) prediction unit 23, an inter-picture (inter-frame) prediction unit 24, a prediction selection unit 25, and a rate control unit 26.

Video signals inputted into the H.264 image coding apparatus are converted by the A/D converter 11, from analog signals to digital video signals. The digital video signals include a brightness signal Y and color-difference signals Cb and Cr. Pictures (frames) of the video signals are sorted by the picture sorting buffer 12, from an order of inputted (displaying) pictures to an order of coding pictures, as shown in FIG. 2. The order of coding pictures is determined depending on a structure of a Group of Pictures (GOP) which includes I, P, and B pictures to be coded.

I picture, which is one of the types of the pictures to be coded, is a picture to be coded by intra-picture (intra-frame) prediction coding, using only the I picture itself without any reference pictures. P picture is a picture to be coded by inter-picture (inter-frame) prediction coding, referring to a single coded picture. B picture is a picture to be coded by inter-picture prediction coding, referring to two or more coded pictures at the same time.

Each picture in a series of moving pictures is one unit to be coded, and such a picture is equivalent to a frame or a field. In the case of 4:2:0 format, one picture includes one brightness signal (Y signal 31) and two color-difference signals (Cb signal 32 and Cr signal 33) as shown in FIG. 3. An image size of a color-difference signal is vertically and horizontally ½ of a brightness signal.

Moreover, each picture in moving pictures is divided into blocks called macroblocks, and then coded on a macroblock-by-macroblock basis. As shown in FIG. 4, one macroblock includes: an Y signal block 41 of 16×16 pixels; and a Cb signal block 42 and a Cr signal block 43, each of which is a 8×8-pixel block spatially corresponding to the Y signal block 41 (see ITU-T Recommendation H.264, for example).

Each of the inputted pictures is divided by the macroblock dividing unit 13 into input macroblocks. The macroblocks are inputted to the subtraction operation unit 14. The subtraction operation unit 14 performs difference processing to detect difference between: each of pixels in the input macroblock; and a spatially corresponding pixel in a prediction macroblock which is generated by the intra-picture prediction unit 23 or the inter-picture prediction unit 24. Thereby, the subtraction operation unit 14 outputs a difference macroblock.

The difference macroblock is provided to the orthogonal transformation unit 15 to be applied with frequency conversion to be converted to a plurality of orthogonal transformation blocks. A size of one orthogonal transformation block is 8×8 pixels in the conventional MPEG method, but in the H.264 standard, the basic size is 4×4 pixels.

The orthogonal transformation unit 15 divides, as shown in FIG. 5, the difference macroblock into 24 blocks (51-0 to 51-15, 52-0 to 52-3, and 53-0 to 53-3) each having 4×4 pixels. The orthogonal transformation unit 15 performs orthogonal transformation for each of the blocks.

The quantization unit 16 quantizes orthogonal transformation coefficients in each orthogonal transformation block, according to quantization parameters obtained from the rate control unit 26. The quantized orthogonal transformation coefficients are provided to the entropy coding unit 17 which codes the coefficients.

The entropy coding unit 17 codes the quantized orthogonal transformation coefficients and prediction information which is selected by the prediction selection unit 25 as described further below, and provides the coded date to the accumulation buffer 18. The accumulation buffer 18 outputs the accumulated coded data as a stream.

The quantized orthogonal transformation coefficients are provided also to the inverse-quantization unit 19, as well as the entropy coding unit 17. According to the quantization parameters obtained from the rate control unit 26, the inverse-quantization unit 19 performs inverse quantization for the quantized orthogonal transformation coefficients. Thereby, the orthogonal transformation block is reconstructed from the quantized orthogonal transformation block. The inverse orthogonal transformation unit 20 re-constructs the difference macroblock from the reconstructed orthogonal transformation block. The reconstructed difference macroblock as well as the prediction macroblock are provided to the addition operation unit 21.

The addition operation unit 21 performs addition processing for pixels of the reconstructed difference macroblock and the prediction macroblock, thereby generating a reproduction macroblock. This reproduction macroblock is accumulated into the picture memory 22 to be further utilized for prediction processing.

The above-explained series of processing performed by the inverse-quantization unit 19, the inverse orthogonal transformation unit 20, and the addition operation unit 21 is called local decoding. This local decoding needs capability of generating a reproduction macroblock which should be the same as the data that will be obtained by decoding the macroblock by a decoding apparatus.

There are two different methods for predicting a prediction macroblock: intra-picture prediction and inter-picture prediction. The intra-picture prediction is a method for predicting pixels in the macroblock, using coded pixels in a picture which has the macroblock. The H.264 standard has two different units applied with this prediction: a 4×4 block and a 16×16 block.

On the other hand, the inter-frame prediction is a method for predicting pixels in the macroblock, using pixels in a different coded picture. Pictures to be applied with this inter-frame prediction are P pictures and B pictures. Note that the pixels in the coded picture are read out from the picture memory 22. Note also that a target macroblock which is currently to be coded is a macroblock outputted from the macroblock dividing unit 13. More specifically, this inter-frame prediction includes motion estimation and motion compensation. In the motion estimation, a motion vector is calculated by detecting a portion similar to a portion of the target macroblock from the coded picture (reference picture). In the motion compensation, a prediction block is generated using the calculated motion vector and the reference picture. In the motion compensation of the H.264 standard, there are various block sizes for motion vector calculation, so that it is possible to select a block size which results in minimum difference from the coded reference picture.

The prediction selection unit 25 compares a macroblock of an original image with prediction image (prediction macroblocks) which are predicted by the intra-picture prediction unit 23 and the inter-picture prediction unit 24, and then selects a prediction macroblock having minimum difference from the macroblock of the original image.

The selected prediction macroblock is provided to the subtraction operation unit 14 and the addition operation unit 21. Furthermore, prediction information such as the selected prediction method (a prediction macroblock, a motion vector, and a reference picture number which are selected by intra-picture prediction or inter-picture prediction) is provided to the entropy coding unit 17.

In the meanwhile, in the H.264 standard, Context-based Adaptive Binary Arithmetic Coding (CABAC) is adapted as entropy coding in order to increase compression rate more than the conventionally variable length coding. The CABAC processing mainly includes: converting of multi-value data to binary data; and arithmetic coding by calculating a context of the binary data.

The arithmetic coding extracts a context for each to-be-compressed code. The context is switched to another, depending on a current target image or surrounding circumstances. Then, possibilities of generation of binarized symbols 0 and 1 are changed for each extracted context, and a generation possibility table is updated depending on the arithmetic coded values. Therefore, pipelining processing or speculative processing become difficult, and it is necessary to increase a speed of the CABAC processing itself (clock) for speeding up those processing.

Here, in the CABAC of the H.264 standard, a maximum coding amount per macroblock (hereinafter, referred to as a "maximum MB coding amount") is limited to 3200 bits in the case of 4:2:0 format and 8 bit_depth. Therefore, when a coding amount of a macroblock exceeds 3200 bits, it is necessary to change conditions for coding the macroblock in order to re-code the macroblock, so that the coding amount becomes equal to or less than 3200 bits. However, a coding amount in the CABAC is changed depending on context change or generation possibility table update, so that the exact coding amount is not known until actual coding is completed. Therefore, whether or not the macroblock is to be re-coded is determined by checking a coding amount of the macroblock after the CABAC processing.

For the above reasons, a method has been proposed to monitor input and output data of the arithmetic coding unit, and if a coding amount of a macroblock becomes nearly over 3200 bits, switch the data to Intra Macroblock Pulse Coding Modulation (I_PCM) data that is non-compressed digital image data, as disclosed in Japanese Unexamined Patent Application Publication No. 2004-135251, for example. In this method, by estimating a generated coding amount prior to completion of arithmetic coding, it is possible to prevent occurrence of a macroblok nearly over 3200 bits, so that re-coding of such a macroblock can be prevented.

SUMMARY

However, in the conventional technology by which a macroblock nearly over 3200 bits is switched to an I_PCM macroblock, although re-coding of the macroblock can be prevented, there is a risk of affecting blocks or macroblocks which have been coded by referring to the macrobock, since the macroblock is replaced by the different I_PCM macroblock.

Coding of moving pictures generally uses pipelining processing to process a plurality of macroblocks together by changing a starting timing for each macrobolock. For example, as shown in FIGS. 6 and 7, in the processing performed by the entropy coding unit, a macroblock MB1 is sometimes replaced by an I_PCM macroblock. If the macroblock MB1 is replaced by the I_PCM macroblock, a macroblock MB2 temporally following the macroblock MB1 is applied with intra-picture prediction or inter-picture prediction, by referring to a decoded data of the macroblock MB1 which has not yet been replaced by the I_PCM macroblock.

For example, in intra-picture prediction of the H.264 image coding, as shown in FIG. 8, in order to predict pixel values (values of pixels shown by white circles) of a target block (or macroblock), boundary pixel values (values of pixels shown by black circles) of coded blocks (or macroblocks) around the target block are used. Here, there is a case where a block A (or macroblock MB1) which is positioned on immediately left of a target block (or macroblock MB2) is replaced by an I_PCM data. In this case, since a pixel value of the target block (or macroblock MB2) is changed when a boundary pixel value of the coded block (or macroblock) is changed, it is necessary to re-code (re-predict) the target block (or macroblock MB2).

Moreover, in the inter-picture prediction in the H.264 image coding, as shown in FIG. 9, when a motion vector of the target macroblock MB2 is calculated, a center value of motion vectors (mvA, mvB, and mvC) of macroblocks (or blocks) around (on the left of, above, and on upper right of) the target macroblock MB2 is set to a prediction motion vector of the target macroblock. Then, coding of difference between the prediction motion vector of the target macroblock and an actual motion vector of the target macroblock realizes data compression. In this case, like the above case, when a neighbor macroblock (for example, macroblock MB1 on the left) of the target macroblock is replayed by an I_PCM macroblock, a motion vector is considered as "none" and a value of the prediction motion vector is changed. Thereby, it is necessary to re-calculate a value of the motion vector and re-code the macrobock.

As explained above, in the pipelining processing of the H.264 coding, when a macroblock is replaced by an I_PCM data in the entropy coding unit, macroblocks around the maroblock are affected. Therefore, unless the coding processing is temporarily stopped to perform re-coding, the number of macroblocks to be re-coded is increased.

Furthermore, in the practical arithmetic coding of the CABAC, a large amount of data would be processed depending on binary data to be compressed or contexts. In order to cope with such large-amount data, the arithmetic coding circuit is operated at a high speed according to the predicted maximum data amount, but this results in huge power consumption. Therefore, in the CABAC, in general, a circuit is implemented with an average CABAC processing amount, by utilizing characteristics that CABAC processing amount is significantly varied depending on image data to be coded, and the number of clocks is reduced by asynchronously operating circuits for the binarization and the arithmetic coding.

However, if the arithmetic coding is executed at the average CABAC processing speed, data delay occurs between the binarization and the arithmetic coding, which sometimes results in accumulation of binary data of several pictures waiting for the arithmetic coding. When standard violation occurs among the several pictures and these pictures need to be re-coded, it is necessary to destroy all of the accumulated binary data and perform re-coding, in the worst case.

FIG. 10 is a diagram showing a situation where delay of six pictures occurs between the binarization and the arithmetic coding in the CABAC processing. In FIG. 10, characters assigned to respective pictures represent types of the pictures. In more detail, "I" represents a picture subjected to prediction coding using the picture itself. "P" represents a picture subjected to prediction coding performed using pictures in one direction (uni-prediction coding). "B" represents a picture subjected to prediction coding using pictures in two directions (bi-prediction coding). It is assumed that the CABAC processing has already been performed up to P23, that the binarization processing has already been performed for six pictures B21, B22, P26, B24, B25, and P29 which are currently waiting for the arithmetic coding. Here, if a macroblock of over 3200 bits is detected in a picture P23 for which the arithmetic coding has already been performed, it is necessary to destroy total seven pictures, which are the accumulated six pictures for delay and the picture P23, and to re-code these pictures.

As explained above, if a certain macroblock is replaced by an I_PCM macroblock, in addition to the data delay problem due to the CABAC, there is another problem of necessity of re-coding, because the replacement affects blocks, macroblocks, and also pictures (frames) which have referred to the certain macroblock. Especially when a macroblock in an I or P picture is replaced by an I_PCM macroblock, a range where the replacement affects is broad, and in the worst case, all pictures have to be re-coded.

Accordingly, once standard violation occurs, re-coding becomes necessary depending on a structure of the coding processing. Furthermore, it is sometimes necessary to destroy all binary data waiting for the arithmetic coding, re-read all data after a picture having the standard violation from the image memory, and re-code the data. Especially in the CABAC processing and prediction coding for generating coded data as input of the CABAC, real-time re-coding becomes necessary, in other words, general coding and the re-coding need to be performed at the same time. Therefore, an amount in the whole processing is doubled, thereby increasing power consumption, which results in various problems of making controls and circuits for the processing-returning complicated.

Here, the real-time re-coding is necessary not only when the standard violation that a coding amount of a macroblock exceeds the 3200-bit maximum MB coding amount. For example, the real-time re-coding is necessary also when buffer constraint violation, such as underflow or overflow of a Coded Picture Buffer (CPB), occurs.

In order to solve the above problems, an aspect of the invention provides an image coding/recording apparatus which can solve problems of large processing loads due to the real-time re-coding and problems of complicated controls and circuits for the processing-returning.

The image coding/recording apparatus according to an aspect of the invention codes and records image data. The image coding/recording apparatus includes: a coding unit operable to code the image data; a recording unit operable to record the coded data coded by the coding unit; and a re-coding control unit operable to (i) control the coding unit to re-code data, which is among the coded data recorded by the recording unit and does not satisfy a predetermined condition, so that the re-coded data satisfies the predetermined condition, and (ii) control the recording unit to record the re-coded data, so that the re-coded data which is re-coded and non-re-coded data which is not re-coded are reproduced consecutively. Thereby, it is not necessary to perform the general coding and the re-coding at the same time, which makes it possible to solve problems of large processing loads due to the real-time re-coding and problems of complicated controls and circuits for the processing-returning.

Further, the re-coding control unit may include: a determination unit operable to determine whether or not the coded data satisfies the predetermined condition; a violation information extraction unit operable to extract violation information from the recording unit, when it is determined that the coded data does not satisfy the predetermined condition, the violation information being information regarding violation that is a fact that the coded data does not satisfy the predetermined condition; a decoding unit operable to decode, based on the violation information, data which is among the coded data recorded by the recording unit and becomes necessary for the re-coding; and a control unit operable to (i) control the coding unit to re-code the data decoded by the decoding unit, so that the re-coded data satisfies the predetermined condition, and (ii) control to the recording unit to record the re-coded data. Thereby, it is possible to previously accumulate a recoding position of coded data at the time of standard violation and the violation information, and then after coding, to re-code data based on the recording position and the violation information.

Furthermore, the re-coding control unit may include: a determination unit operable to determine whether or not the coded data satisfies the predetermined condition; a violation information extraction unit operable to extract violation information from the recording unit, when it is determined that the coded data does not satisfy the predetermined condition, the violation information being information regarding violation that is a fact that the coded data does not satisfy the predetermined condition; a decoding unit operable to decode, based on the violation information, data which is among the coded data recorded by the recording unit and becomes necessary for the re-coding; and a control unit operable to (i) control the coding unit to re-code the data decoded by the decoding unit, so that the re-coded data satisfies the predetermined condition, and (ii) control to the recording unit to record the re-coded data. Thereby, it is possible to previously accumulate a recoding position of coded data at the time of standard violation and the violation information, and then after coding, to re-code data based on the recording position and the violation information.

Still further, the violation information extraction unit may be operable to extract the violation information which includes (i) position information indicating where the coded data is recorded by the recording unit, (ii) violation detail indicating that the coded data does not satisfy the predetermined condition, and (iii) coding information in case of that the coded data does not satisfy the predetermined condition. Thereby, the violation detail and the like are extracted, so that it is possible to perform the re-coding according to the violation detail and the like.

Still Further, the re-coding control unit may be operable to control the coding unit to re-code the data by setting a quantization value of the data to a greater value, when the violation detail indicates that a coding amount of a macroblock in the data exceeds the maximum MB coding amount. Thereby, a coding amount of the re-coded macroblock is reduced, which makes it possible to prevent the problem that the coding amount exceeds the maximum MB coding amount.

Still Further, the re-coding control unit may be operable to control the recording unit to record the re-coded data, as a Bridge Clip file of a Virtual PlayList which is a virtual edit function of a Blu-ray Disk. Thereby, it is possible to connect the re-coded data, as a Bridge Clip file, to the non-re-coded data, which makes it possible to realize seamless reproduction, in other words, consecutive reproduction in which one image is connected to another without stop or interruption.

Still Further, the re-coding control unit may be operable to control the recording unit to record the re-coded data, as a Bridge Clip file of a Virtual PlayList which is a virtual edit function of a Blue-ray Disk. Thereby, it is possible to connect the re-coded data, as a Bridge Clip file, to the non-re-coded data, which makes it possible to realize seamless reproduction, in other words, consecutive reproduction in which one image is connected to another without stop or interruption.

Still Further, the re-coding control unit may be operable to control the coding unit to code a group of independent pictures, by changing an I picture to an Instantaneous Decoding Refresh (IDR) picture, when it is determined that the coded data does not satisfy the predetermined condition, the group immediately following a stream in which violation occurs, and the I picture being a starting picture in the group. Thereby, it is possible to prevent the group of the independent pictures from being affected by the re-coded data, which makes it possible to reproduce the group of the pictures seamlessly without stop or interruption.

Still Further, the re-coding control unit may be operable to control the coding unit to re-code the data, at a timing when a series of the coding and recoding processing is stopped or completed. Thereby, the re-coding is not executed until a series of the coding and recording processing is stopped or completed, so that usability of the present invention is not deteriorated.

Note that the invention is not realized only as the above image coding/recording apparatus, but also as: an image coding/recording method which includes processing performed by the characteristic units included in the image coding/recording apparatus; an integrated circuit which includes the characteristic units included in the image coding/recording apparatus; and the like.

Thus, according to the image coding/recording apparatus in an aspect of the invention, it is not necessary to perform the general coding and the re-coding at the same time, which makes it possible to solve problems of large processing loads due to the real-time re-coding and problems of complicated controls and circuits for the processing-returning.

Furthermore, it is possible to connect re-coded data, as a Bridge Clip file in a Virtual Playlist which is a virtual edit function of a Blu-ray Disk, with non-re-coded data, which makes it possible to realize seamless reproduction.

INCORPORATION BY REFERENCE

The disclosure of Japanese Patent Application No. 2006-161018 filed on Jun. 9, 2006 including specification, drawings and claims is incorporated herein by reference in its entirety.

BRIEF DESCRIPTION OF THE DRAWINGS

These and other advantages and features of the invention will become apparent from the following description thereof taken in conjunction with the accompanying drawings that illustrate embodiments of the invention. In the Drawings:

FIG. 15 is a table showing examples of coding violation details which results in necessity of re-coding, and avoidance controls;

FIG. 18 is a diagram showing one example of a method for connecting a re-coded stream with another;

DETAILED DESCRIPTION

The following describes an embodiment according to the invention with reference to the drawings.

Figure 1:
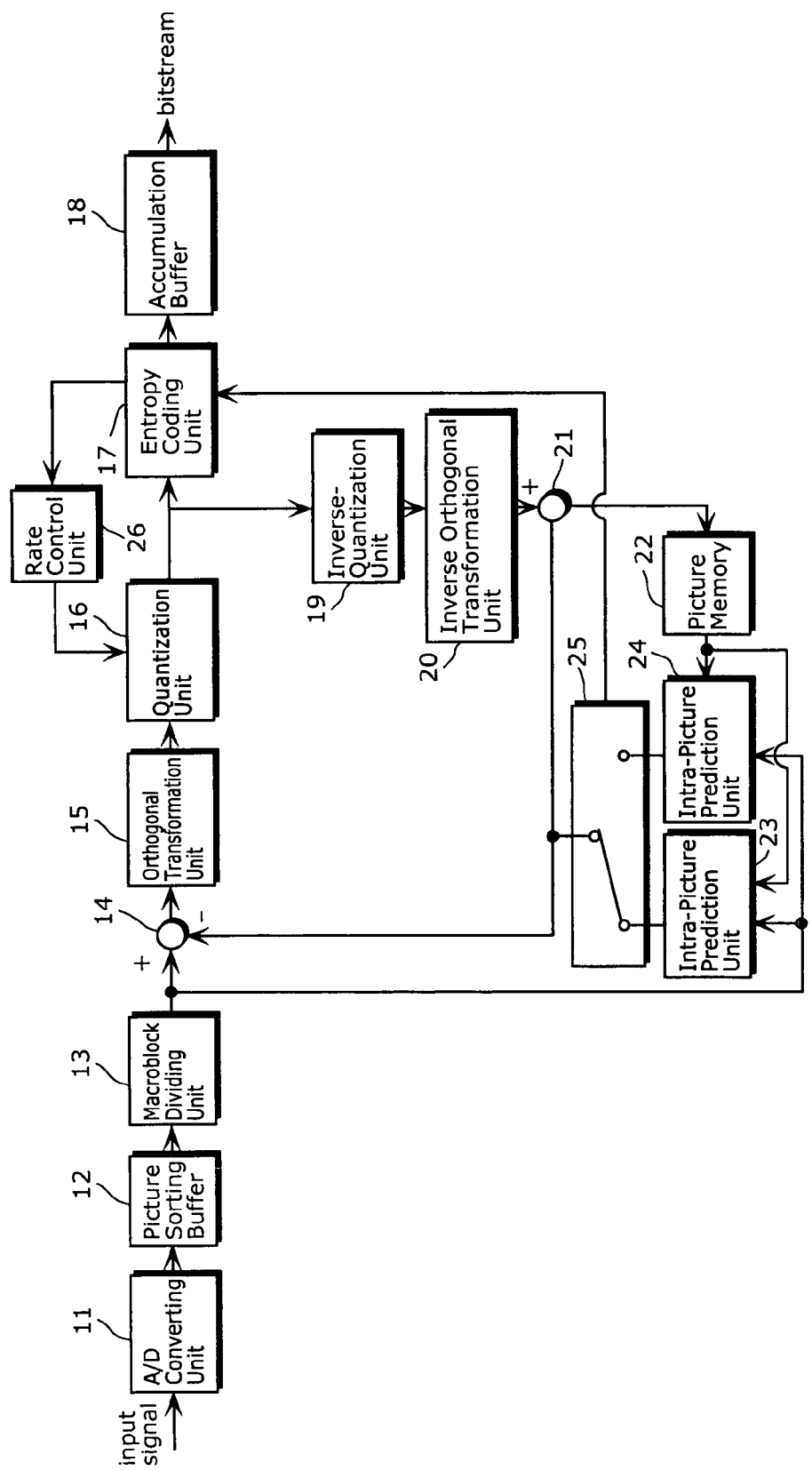
FIG. 1 is a functional block diagram showing an example of a functional structure of the conventional image coding apparatus.
Figure 2:
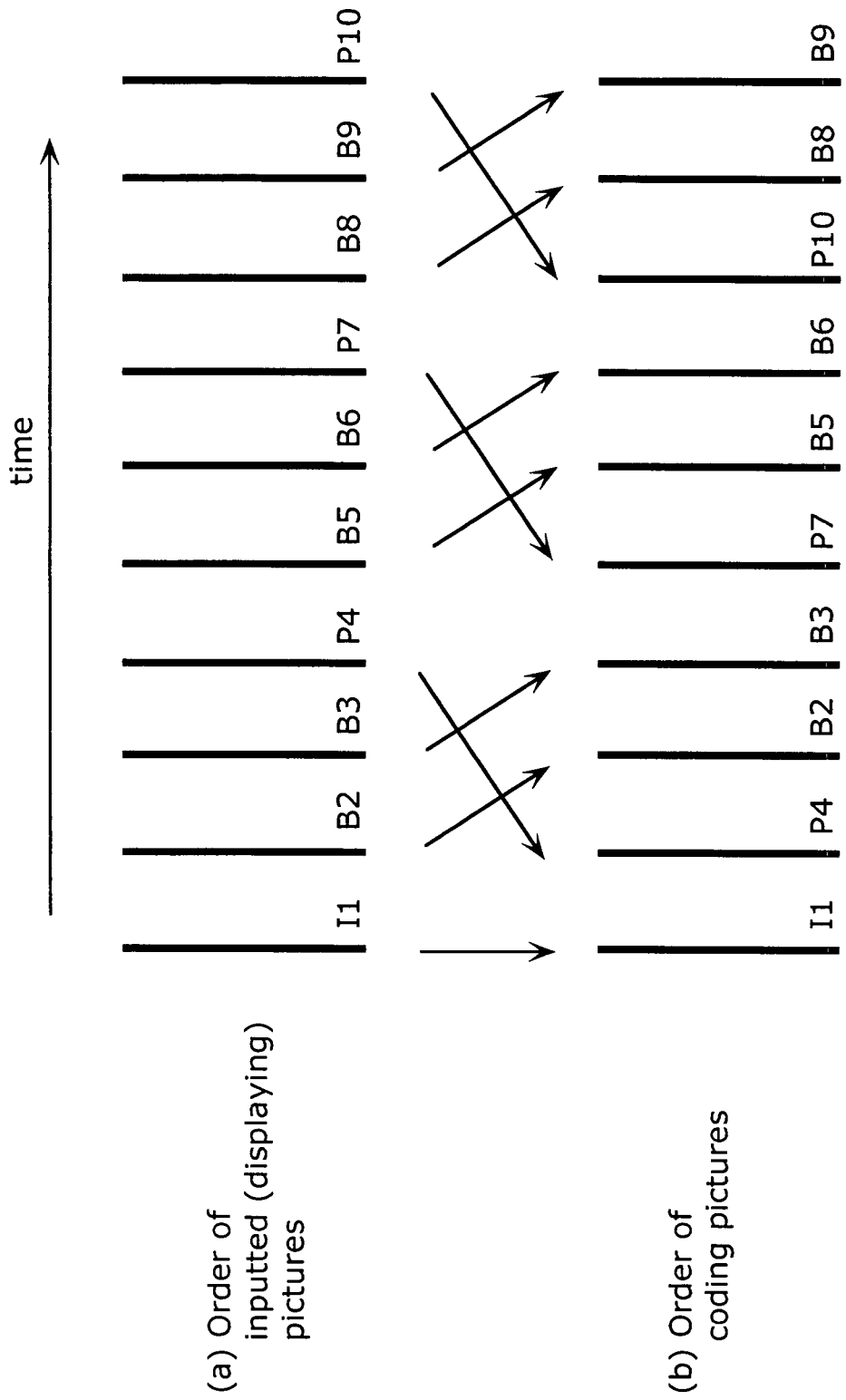
FIG. 2 is a diagram showing a display order and a coding order of pictures.
Figure 3:
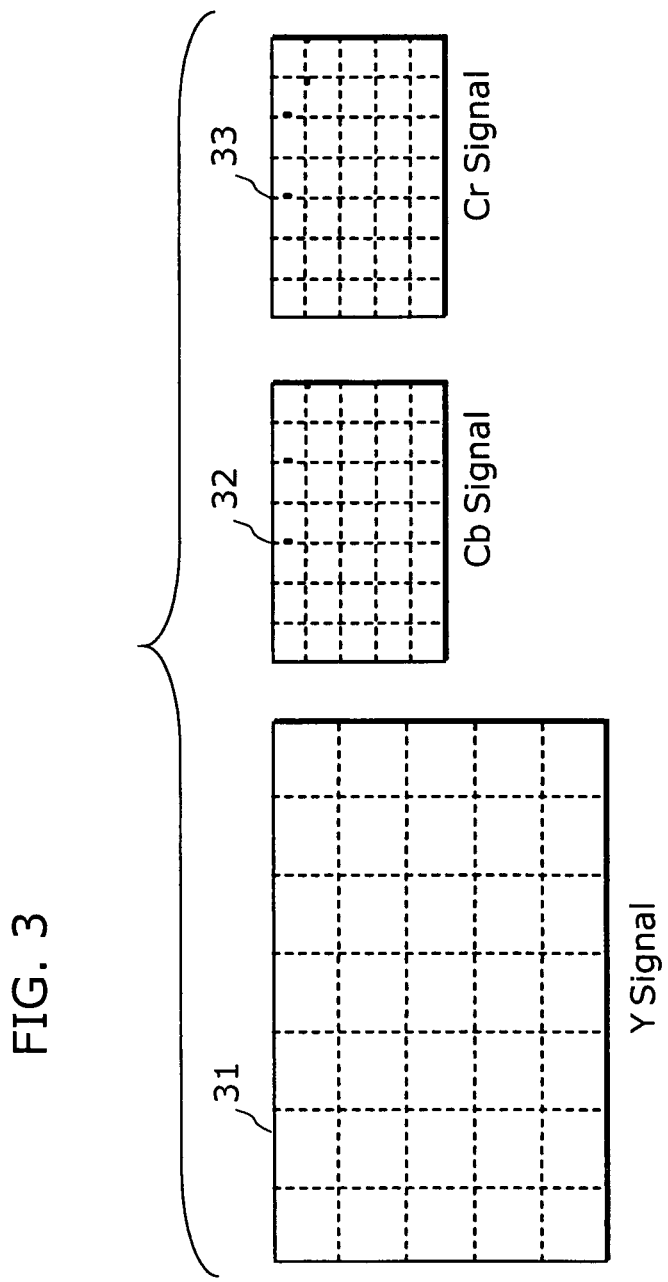
FIG. 3 is a diagram showing video signals in one picture in 4:2:0 format.
Figure 4:
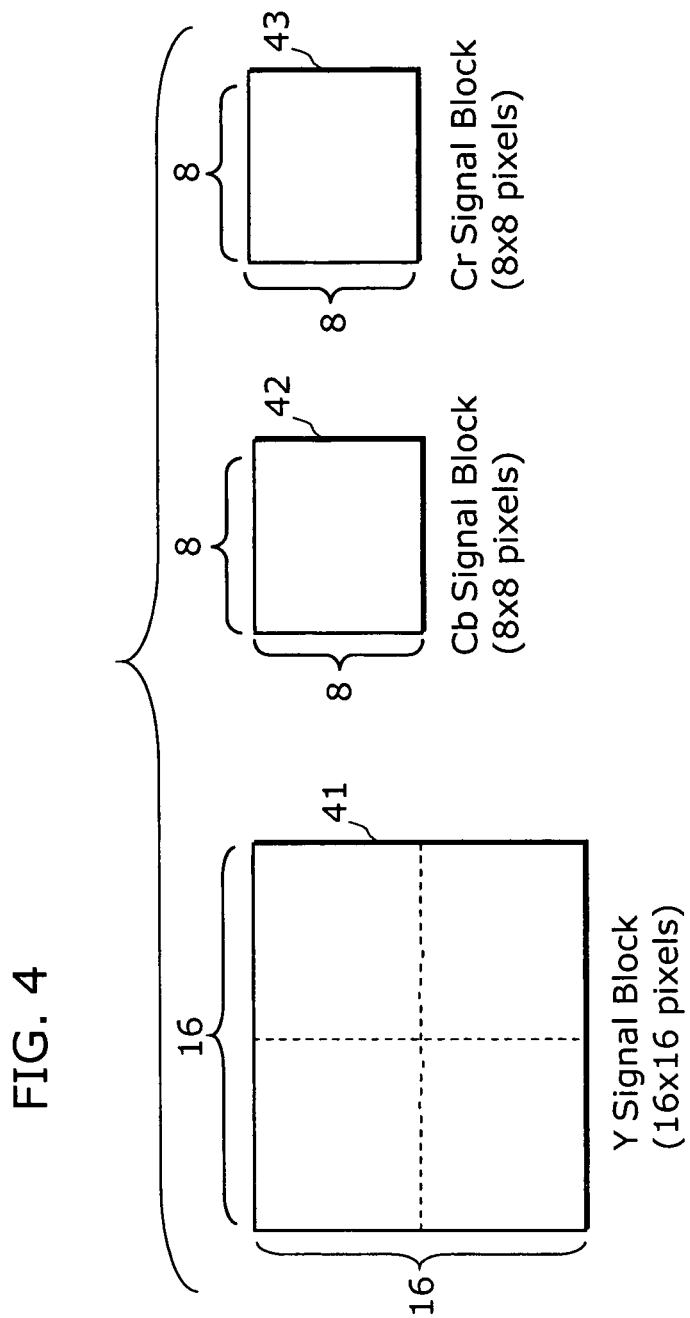
FIG. 4 is a diagram showing video signals in one macroblock in 4:2:0 format.
Figure 5:
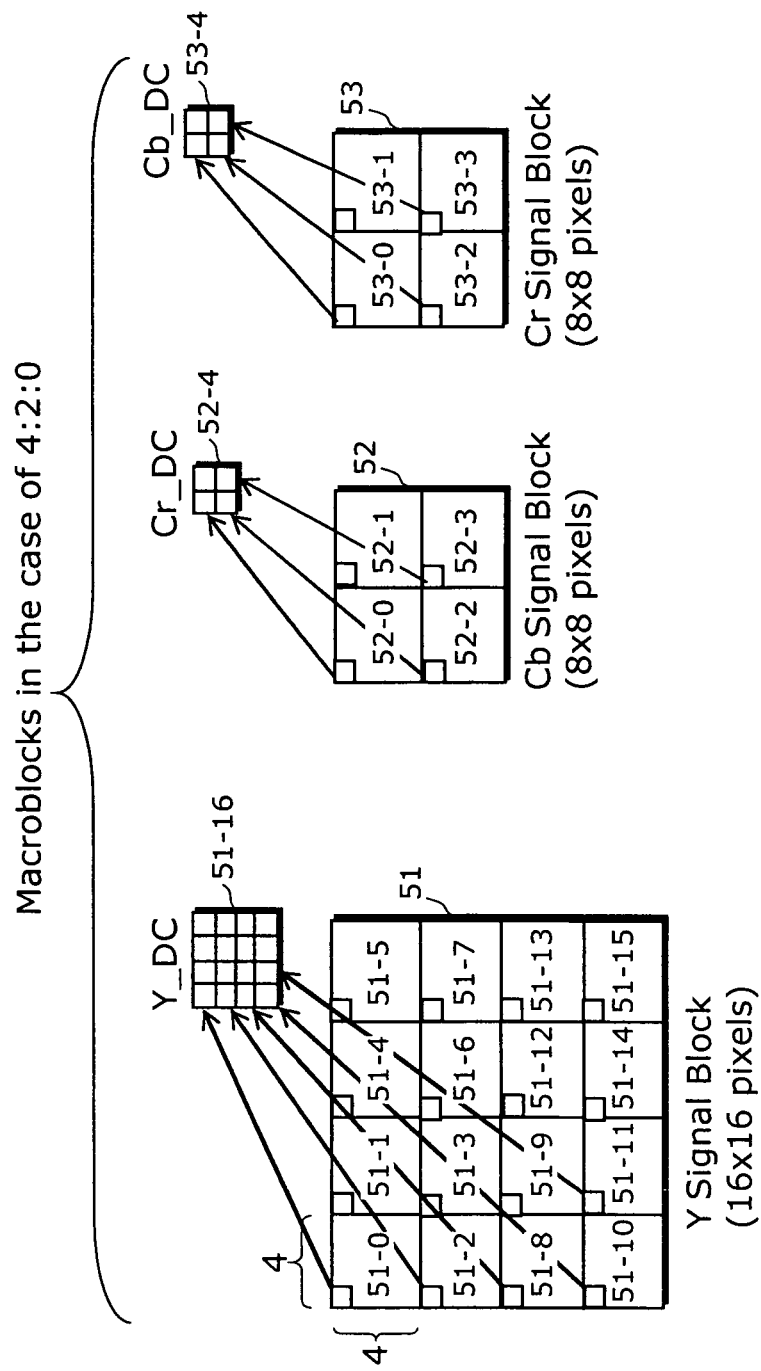
FIG. 5 is a diagram showing orthogonal transformation blocks in one macroblock in 4:2:0 format.
Figure 6:
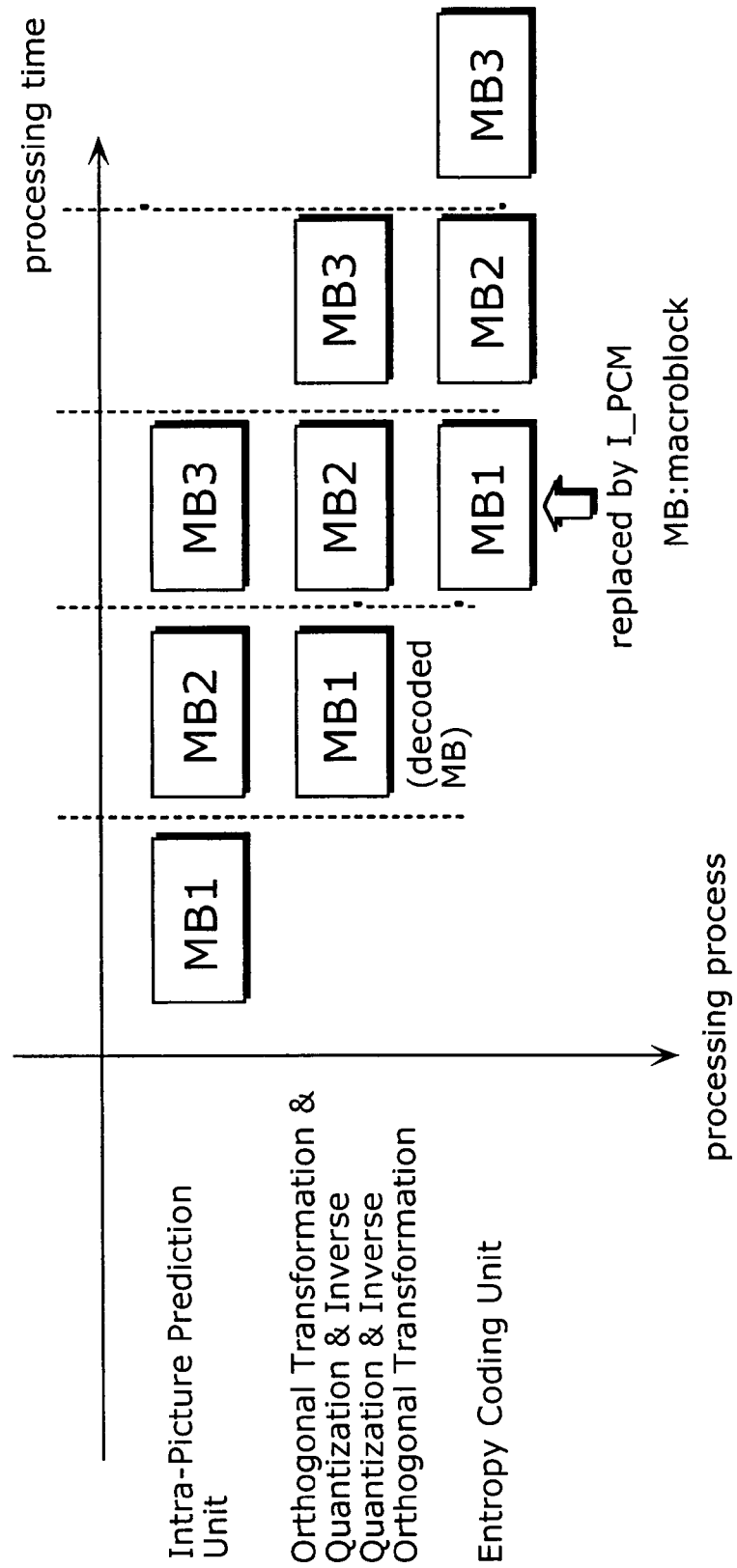
FIG. 6 is a diagram showing pipelining processing of coding including intra-picture prediction.
Figure 7:
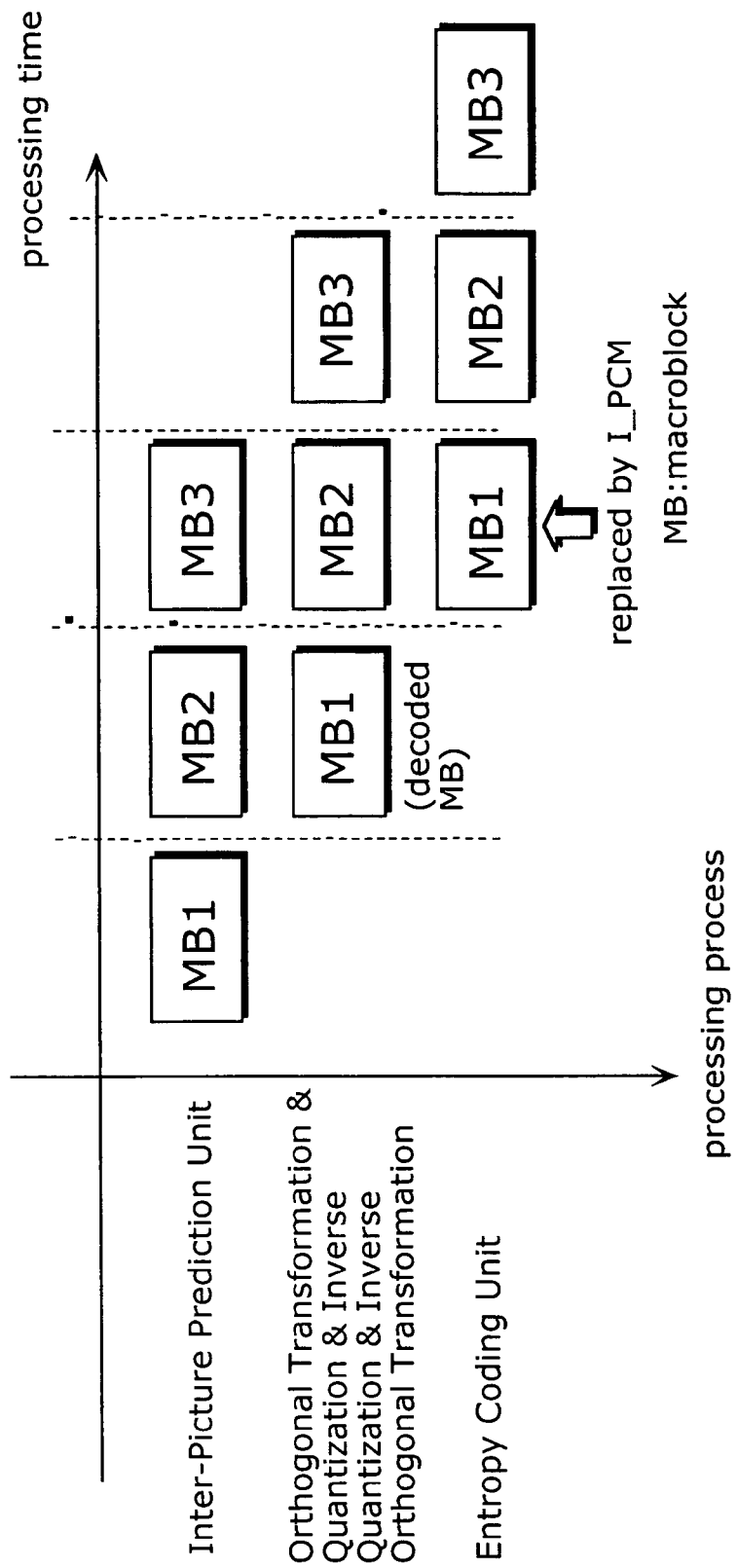
FIG. 7 is a diagram showing pipelining processing of coding including inter-picture prediction.
Figure 8:
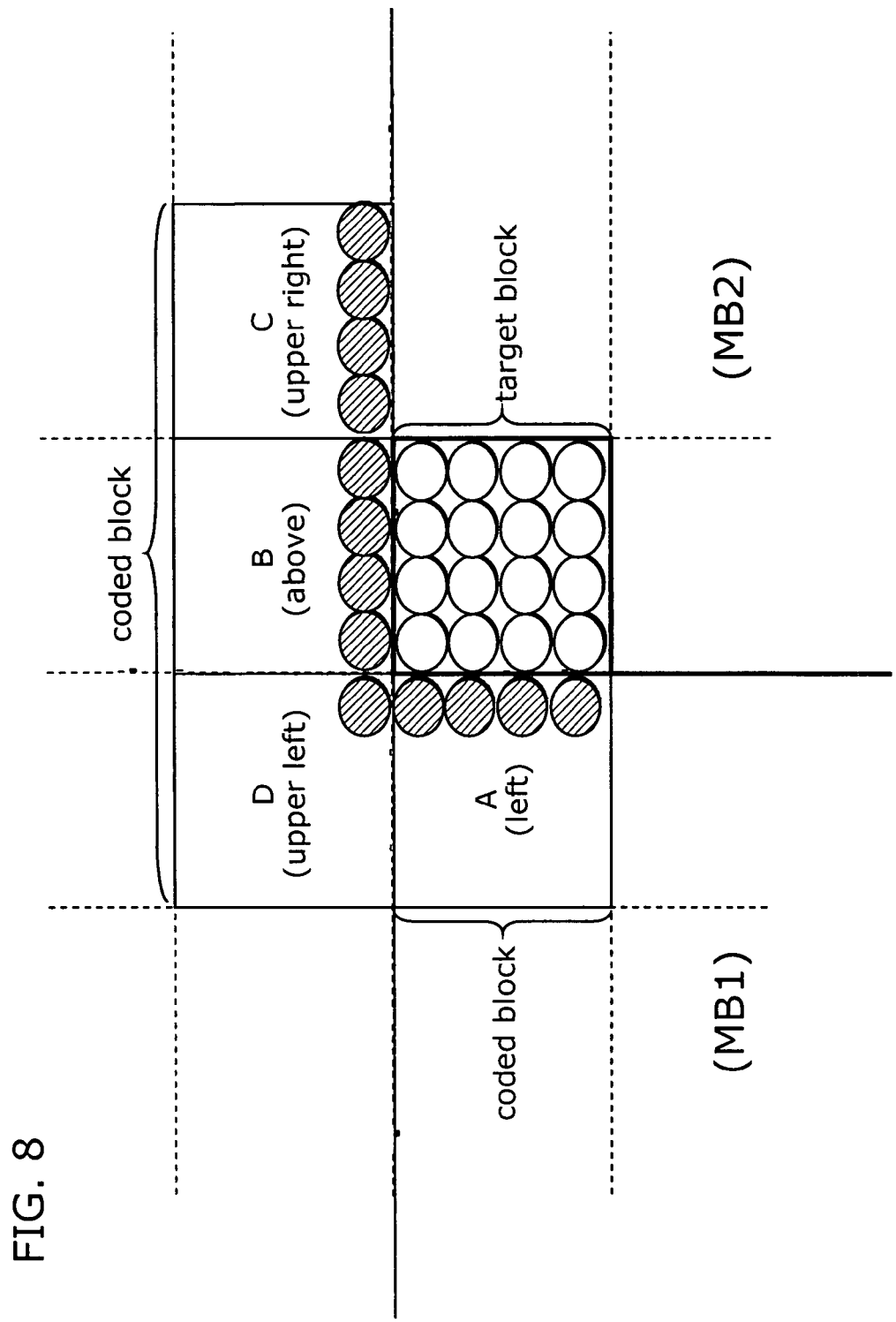
FIG. 8 is a diagram showing relationship between a target block and neighbor blocks in intra-picture prediction.
Figure 9:
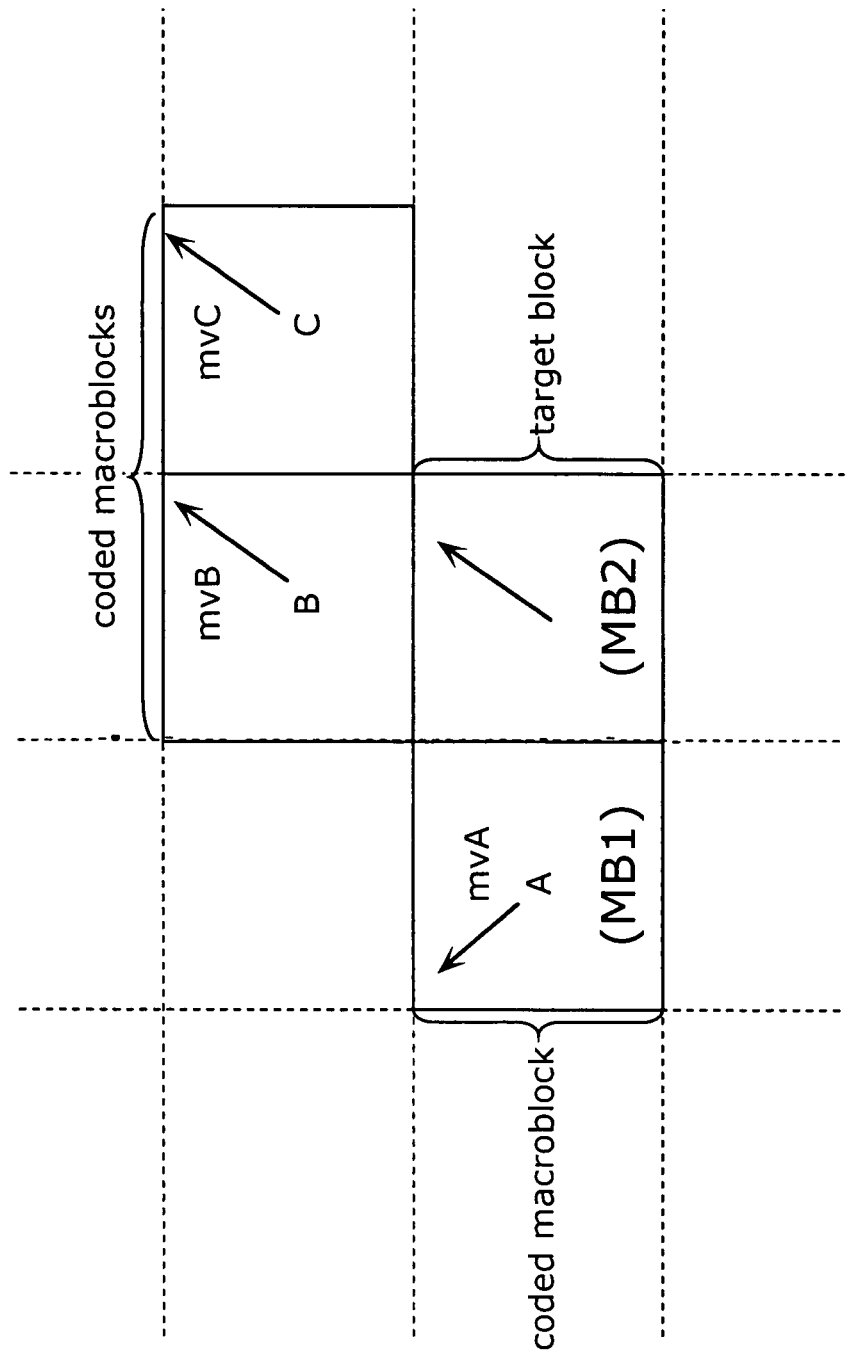
FIG. 9 is a diagram showing relationship between a target block and neighbor blocks in inter-picture prediction.
Figure 10:
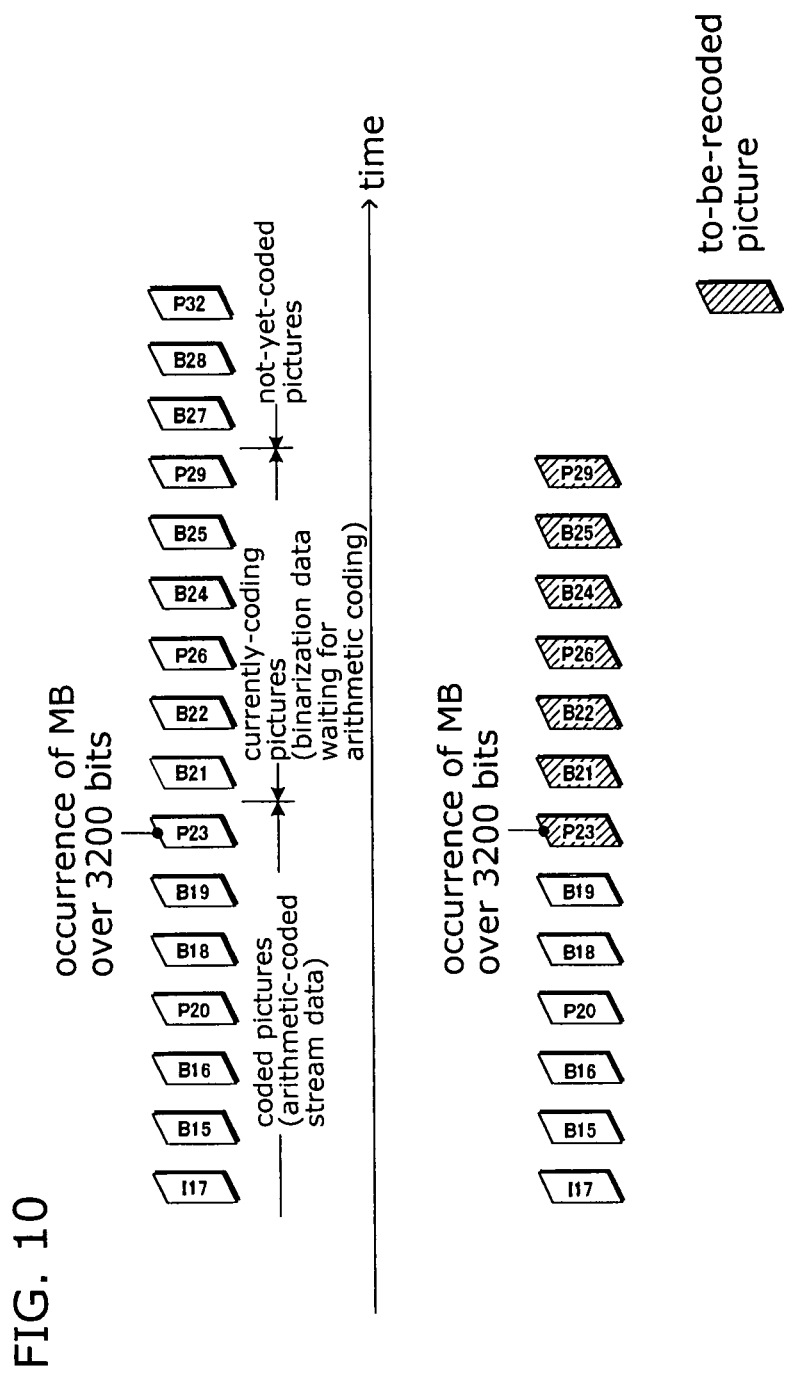
FIG. 10 is a diagram showing pictures in re-coding processing.
Figure 11:
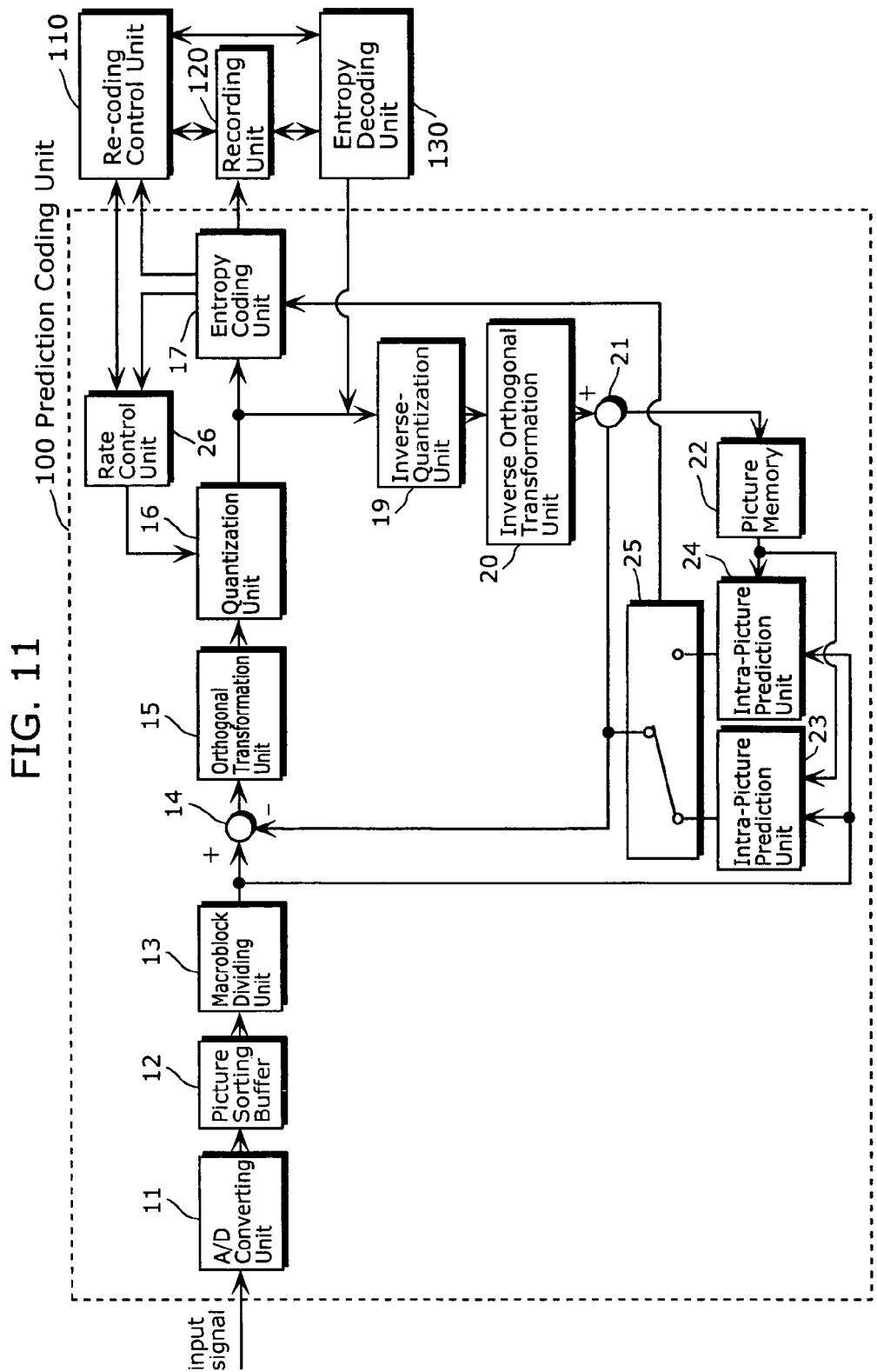
FIG. 11 is a block diagram showing an overall structure of an image coding/recording apparatus according to an embodiment of the invention.

FIG. 11 is a block diagram showing a structure of an image coding/recording apparatus according to the embodiment of the invention. The image coding/recording apparatus is an apparatus which codes image data and records the coded image data. The image coding/recording apparatus includes a prediction coding unit 100, a re-coding control unit 110, a recording unit 120, and an entropy decoding unit 130.

The prediction coding unit 100 is one example of a coding unit according to an aspect of the invention. The prediction coding unit 100 includes an analog/digital (A/D) conversion unit 11, a picture sorting buffer 12, a macroblock dividing unit 13, a subtraction operation unit 14, an orthogonal transformation unit 15, a quantization unit 16, an entropy coding unit 17, an inverse-quantization unit 19, an inverse orthogonal transformation unit 20, an addition operation unit 21, a picture memory 22, an intra-picture prediction unit 23, an inter-picture prediction unit 24, a prediction selection unit 25, and a rate control unit 26. The structure of the prediction coding unit 100 is almost the same as the structure of the image coding apparatus of the H.264 standard which have previously been described in the Description of the Related Art. Therefore, the following mainly describes structures of the re-coding control unit 110, the recording unit 120, and the entropy decoding unit 130.

The re-coding control unit 110 is one example of a re-coding control unit according to an aspect of the invention. The re-coding control unit 110 is a processing unit which causes the prediction coding unit 100 to re-code data which is among coded data recorded by the recording unit 120 but does not satisfy predetermined conditions, so that the re-coded data can satisfy the predetermined conditions. The re-coding control unit 110 also causes the recording unit 120 to record the re-coded data, so that the data which is re-coded and data which is not recoded can be reproduced consecutively. The recording unit 120 is one example of a recording unit according to an aspect of the invention. The recording unit 120 is a processing unit which records the coded data coded by the prediction coding unit 100 onto a recording medium or the like. The entropy decoding unit 130 is one example of a decoding unit according to an aspect of the invention. The entropy decoding unit 130 is a processing unit which decodes, according to violation information described later, data which is among the coded data recorded by the recording unit 120 and becomes necessary for the re-coding processing.

Figure 12:
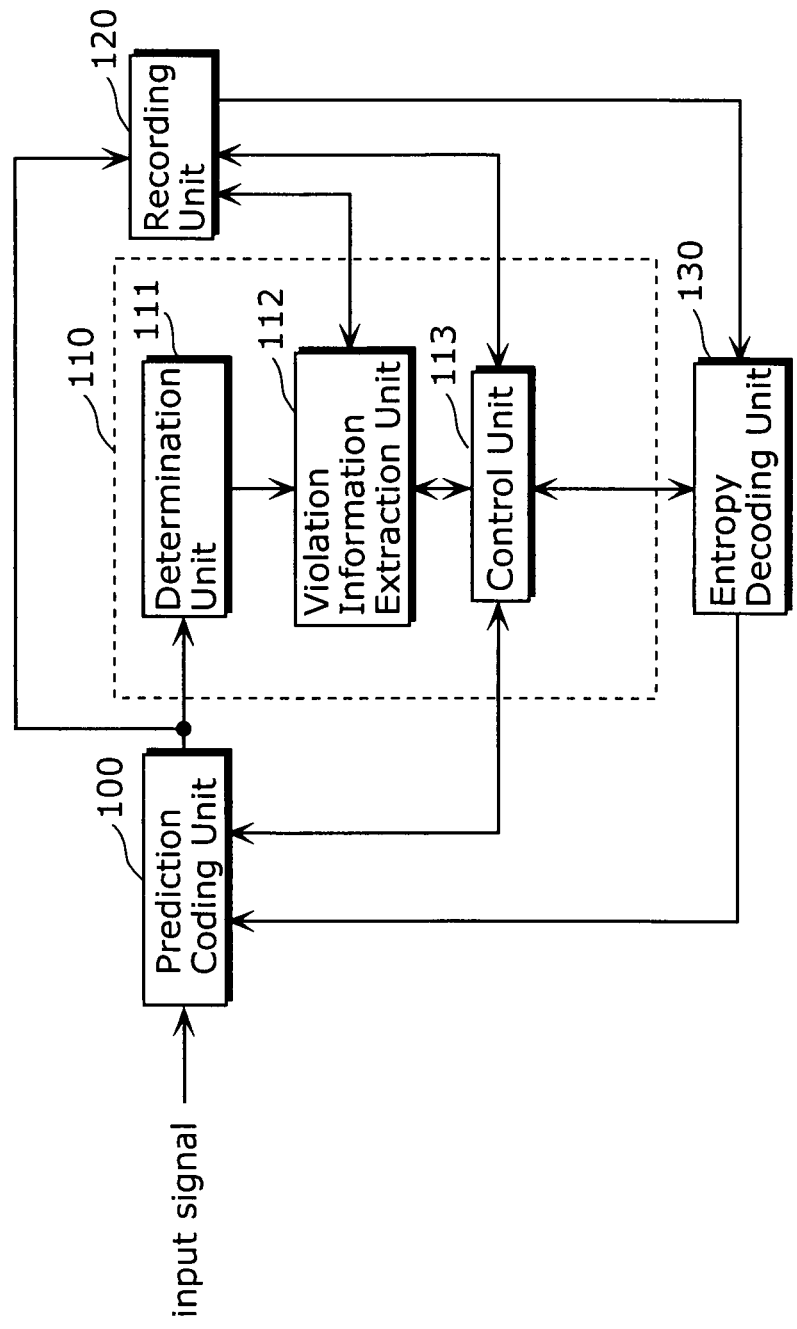
FIG. 12 is a block diagram showing a main structure of the image coding/recording apparatus according to an embodiment of the invention.

FIG. 12 is a diagram showing a structure of the re-coding control unit 110 in more detail. As shown in FIG. 12, the re-coding control unit 110 includes a determination unit 111, a violation information extraction unit 112, and a control unit 113. In addition to the structure of the re-coding control unit 110, the following describes structures of the prediction coding unit 100, the recording unit 120, and the entropy decoding unit 130.

The determination unit 111 is one example of a determination unit according to an aspect of the invention. The determination unit 111 is a processing unit which determines whether or not coded data satisfies the predetermined conditions. In more detail, regarding a coded stream outputted from the entropy coding unit 17 (CABAC unit) of the prediction coding unit 100, the determination unit 111 determines whether or not a coding amount per macroblock in the coded stream exceeds 3200 bits. Furthermore, from the rate control unit 26 to a Coded Picture Buffer (CPB) corresponding to a Video Buffer Verifier (VBV), the determination unit 111 determines whether or not a coded stream satisfies restriction on the buffer, in other words, whether or not overflow or underflow occurs in the buffer. If overflow or underflow occurs, picture decoding fails due to the buffer breakdown making it impossible to realize seamless image reproduction, which is consecutive image reproduction where one image is connected to another without interruption. In such a case, the image is skipped, freezes, or is stopped, for example.

Note that, in the image coding/recording apparatus according to an aspect of the invention, such a coded stream not satisfying the standard is also recorded onto the recording unit 120 temporarily. In other words, even if a coding amount of a macroblock in the stream exceeds 3200 bits, the macroblock is recorded onto the recording unit 120. Furthermore, margins are added to predetermined upper and lower limits, which are reference models of a capacity of a CPB buffer, so that adequate allowance is given for a bit amount of a stream over the upper or lower limit. Thereby, even if the buffer occurs overflow or underflow according to the reference models, streams are able to be outputted to the recording unit 120.

When it is determined that the stream does not satisfy the standard or the buffer does not satisfy the buffer restriction, the determination unit 111 provides information regarding the violation (violation information) to the violation information extraction unit 112. The violation information indicates regarding the state of the stream obtained from the entropy coding unit 17 or the state of the buffer of the rate control unit 26.

The violation information extraction unit 112 is one example of a violation information extraction unit according to an aspect of the invention. The violation information extraction unit 112 is a processing unit which extracts violation information from the recording unit 120 when it is determined that coded data does not satisfy predetermined conditions. The violation information indicates the violation that is a fact that the coded data does not satisfy the predetermined conditions. More specifically, when the violation information is provided from the determination unit 111, the violation information extraction unit 112 extracts, from the recording unit 120, position information indicating where the coded stream is recorded in the recording unit 120. Such position information is different depending on recording mediums, file formats, or applications. Here, the description is given under the assumption that the recording medium is a next-generation recording medium, a Blu-ray Disc Rewritable (BD-RE). Under the assumption, time information indicating when the coded stream with violation (hereinafter, referred to also as "violation coded stream" or "violation stream") is recorded (for example, a time stamp indicating when the violation stream is recorded as a packet) is extracted. In addition to the time information, the violation information extraction unit 112 extracts position information of a starting packet in a unit of data related to the packet. One example of the unit of data is a set of data necessary for reproduction, and the packet has a reference relationship with the unit so that the packet refers to the unit of data or is referred to by the unit of data.

For example, in order to write a coded stream onto the BD-RE, a source packet is used. The source packet is a 192-byte fixed-length packet made up of a 188-byte Transport Stream (TS) packet and a 4-byte time stamp. Such source packets are sequentially recorded onto the BD-RE disk.

If a coding amount of a macroblock exceeds the 3200-bit maximum MB coding amount, the macroblock has 400 bytes or more, occupying a recording region whose amount is equivalent to two or more packets. The violation information extraction unit 112 extracts a time stamp of such a packet in the violation stream.

Furthermore, the violation information extraction unit 112 extracts position information of a starting packet in a set of consecutive pictures to which a picture including the packet of the violation stream is related. Note that an example of the set of consecutive pictures is a group of independent pictures which is equivalent to a GOP in the MPEG-2 standard. Note also that the term "related" means "in a reference relationship of referring to or being referred to by". In the H.264 coding, an Instantaneous Decoding Refresh (IDR) picture or an Intra-picture is a starting picture in a related group of consecutive pictures, and position information of the starting packet is extracted.

In order to extract the position information of the starting packet, a table called TU_map is previously created. The TU_map is a map in which position information (a time unit number, for example) of a starting packet in a group of independent pictures in a coded stream is associated with a Source Packet Number (SPN: obtainable from the number of bytes from a start of a coded stream file) of the coded stream. This is similar to a table called EP_map of the MPEG-2 standard, where a value of a Presentation Time Stamp (PTS: a time stamp for audio/visual synchronization included in a TS) of a start of GOP data is associated with a packet number including the start of the GOP.

The violation information extraction unit 112 provides the violation information obtained from the determination unit 111, to the control unit 113. Furthermore, when the violation stream is recorded as a packet onto the recording unit 120, the violation information extraction unit 112 extracts a time stamp of the packet and starting position information of a group of independent pictures in the coded stream including the packet, and provides these information to the control unit 113.

In the same manner as when standard violation regarding the maximum MB coding amount occurs, when buffer restriction violation such as overflow or underflow occurs, the violation information extraction unit 112 also extracts a time stamp of a packet at the time of the occurrence of the overflow or underflow, and starting position information of a group of independent pictures in the coded stream including the packet, and then provides these information to the control unit 113.

The control unit 113 is one example of a control unit according to an aspect of the invention. The control unit 113 is a processing unit which causes the prediction coding unit 100 to re-code data decoded by the entropy decoding unit 130 so that the re-coded data can satisfy the predetermined conditions, and causes the recording unit 120 to record the re-coded data. In more detail, the control unit 113 obtains the violation information from the violation information extraction unit 112, and also obtains information regarding coding control in the case of the violation occurrence from the prediction coding unit 100. Thereby, the control unit 113 instructs the entropy decoding unit 130 to read, at a predetermined timing, for example at a timing of stopping or completion of a series of coding/recording processing, (i) the violation stream and (ii) a related stream (stream in the reference relationship with the violation stream) including the violation stream from the recording unit 120, and to decode the readout streams. Furthermore, the control unit 113 provides re-coding information which is set to avoid violation, to the prediction coding unit 100. Then, when the prediction coding unit 100 performs the re-coding based on the re-coding information, the control unit 113 controls the recording unit 120 to newly write the re-coded stream onto the recording unit 120.

Note that the information regarding coding control obtained from the prediction coding unit 100 is obtained by the rate control unit 26 and the entropy coding unit 17 of the prediction coding unit 100. In more detail, the information is information regarding coding or a coding amount, such as quantization information at the time of violation occurrence, a coding amount regarding the occurence, an available capacity of a CPB buffer, a type of a coded picture, a type of a coded macroblock, and a mode of the coding. The control unit 113 sets re-coding information used to avoiding violation, based on the information regarding coding control and the violation information.

As mentioned above, the recording unit 20 serves also as a processing unit which holds the violation information extracted by the violation information extraction unit 112. Hereinafter, the recording unit 20 for holding the violation information is referred to also as a "violation information recording unit". In stead of the recording unit 20, a memory buffer included in the image coding/recording apparatus of the present invention may hold the violation information. In such a case, the memory buffer in the image coding/recording apparatus becomes the "violation information recording unit".

Figure 13:
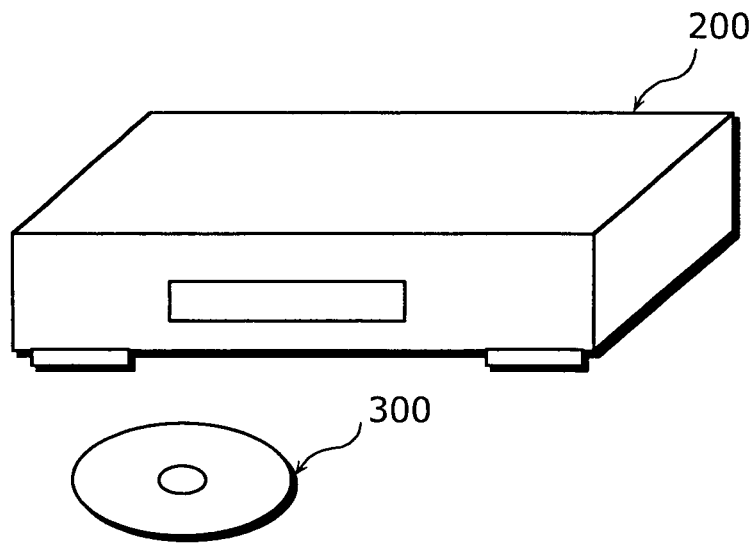
FIG. 13 is an external view of the image coding/recording apparatus according to an embodiment of the invention.

FIG. 13 is an external view of the image coding/recording apparatus according to an embodiment of the invention. FIG. 13 shows a video-recording/reproducing apparatus 200 which can read and write data from/onto a BD-RE 300. Note that the image coding/recording apparatus is not limited to only the video-recording/reproducing apparatus 200, but may be a digital video camera, a portable telephone with a camera function, a hard disk recorder, a PDA, a personal computer, or the like, each of which can record and reproduce MPEG moving pictures. Note also that the recording medium is not limited to only the BD-RE 300, but may be an optical disk, a magnetic disk, a flash memory, or the like.

Figure 14:
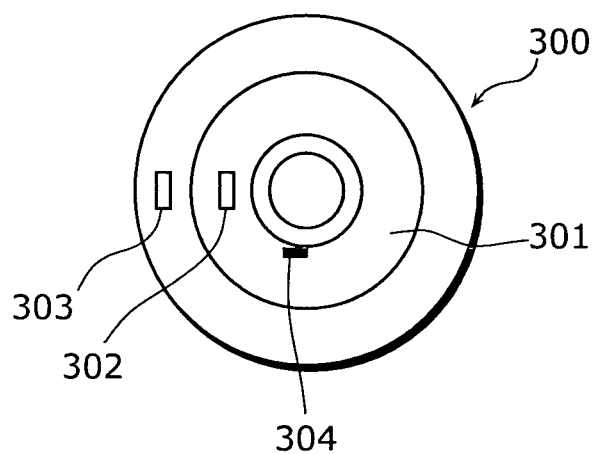
FIG. 14 is a diagram showing how information is recorded on BD-RE.

FIG. 14 is a diagram for explaining information recorded on the BD-RE 300. Here, as conceptually shown, on the BD-RE 300, standard-compliant streams are recorded in a region 301, and standard-violation streams are recorded in a region 303, and violation information is recorded in a region 304.

FIG. 15 is a table showing examples of the re-cording information. As shown in FIG. 15, the re-cording information is information in which each violation detail (assigned with each violation code, for example) is associated with corresponding information for avoiding the violation. More specifically, the re-coding information is coding information for controlling a coding amount per picture (frame) or macroblock and re-coding the picture or macroblock, based on a type of the coded picture (I picture, P picture, or B picture) and a type of the coded macroblock (intra-prediction macroblock or inter-prediction macroblock) in the case of violation occurrence.

For example, a violation code 00 is a violation code representing the exceeding of the maximum MB coding amount (3200 bits). When such violation occurs, a quantization value (or quantization parameter (QP)) at the time of coding the macroblock is set to a greater quantization value, in order to significantly reduce an occurred coding amount. In addition to the setting of the quantization value, initial quantization values of related pictures (frames) including the violation macroblock, or an initial quantization value of a group of independent pictures including these pictures are set. The initial quantization value is set to an optimal value depending on a predetermined goal coding amount.

Likewise, regarding overflow or underflow of a CPB buffer, a quantization value of a picture in which violation occurs (hereinafter, referred to as a "violation picture") is set. More specifically, the quantization value is set to a greater value when overflow occurs, and the quantization value is set to a smaller value when underflow occurs. In addition to the setting of the quantization value, an initial quantization value of a group of independent pictures including the violation picture is set. The initial quantization value is set to an optimal value depending on a predetermined goal coding amount.

Figure 16:
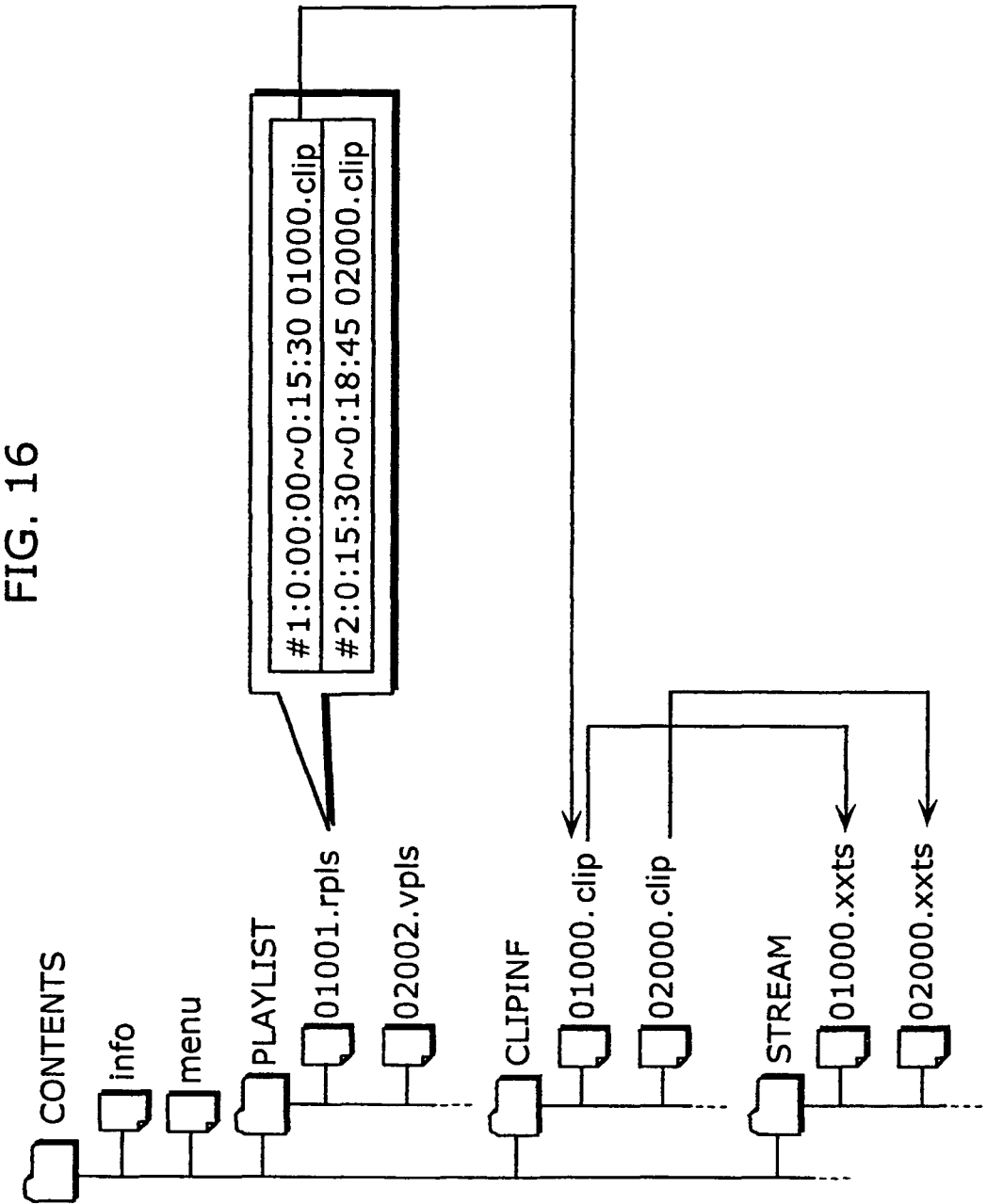
FIG. 16 is a diagram showing an example of a structure of directory files in BD-RE.

FIG. 16 is a diagram showing an example of a structure of directory files in the BD-RE. In FIG. 16, a PlayList directory stores PlayList files, a CLIPINF directory stores Clip Information files, a STREAM directory stores Clip AV Stream files.

A coded stream recorded on the BD-RE disk is called a Clip AV Stream file. These files are shown in FIG. 16, as files stored in the STREAM directory and each having an extension "xxts". Note that the extension differs depending on each AV stream. A database for managing the Clip AV streams is called a Clip Information file. The Clip Information files are shown in FIG. 16, as files stored in the CLIPINF directory and each having an extension "clip". One Clip AV Stream file is associated with one Clip Information file. The Clip Information file stores the above-mentioned TU_map and the like. By combining the TU_map and a time stamp of time information, it is possible to access an arbitrary position in the Clip AV stream. In the Clip Information file, a non-consecutive point of reference time of coding, a random access for the Clip AV stream, information necessary for special reproduction and the like are written.

The Clip AV Stream file and the Clip Information file are called clips. A file which accesses a clip and is used for reproduction control at the time of editing is a PlayList file that is stored in the PLAYLIST directory. A PlayList file is a file in which an interval (IN point and OUT point) between reproducing video data is recorded. The PlayList file is classified into two types: a Real PlayList (with an extension "rpls") and a Virtual PlayList (with an extension "vpls").

The Real PlayList is automatically generated during video-recoding a program or a scene. In a Real PlayList immediately after the video-recording, one PlayItem, which designates a starting point (IN point) and an ending point (OUT point) of the video-recording, is described. On the other hand, the Virtual PlayList is generated during virtual editing, such as connecting a plurality of video-recorded clips regarding user's preferable scenes or connecting temporally-apart videos within an identical clip.

A PlayList is made up of one or more PlayItems. The PlayItem designates a reproduction starting point (IN point) and a reproduction ending point (OUT point) of a clip to be reproduced.

FIG. 16 shows an example of a Real PlayList file having two PlayItems #1 and #2 which access different clip files (having respective reproduction starting points (IN points) and reproduction ending points (OUT points)), respectively.

The following describes a method of re-coding a violation stream and connecting the re-coded stream with a normal stream consecutively, using a Bridge Clip function of the Virtual PlayList. Here, the streams are assumed to be recorded on the BD-RE.

Figure 17:
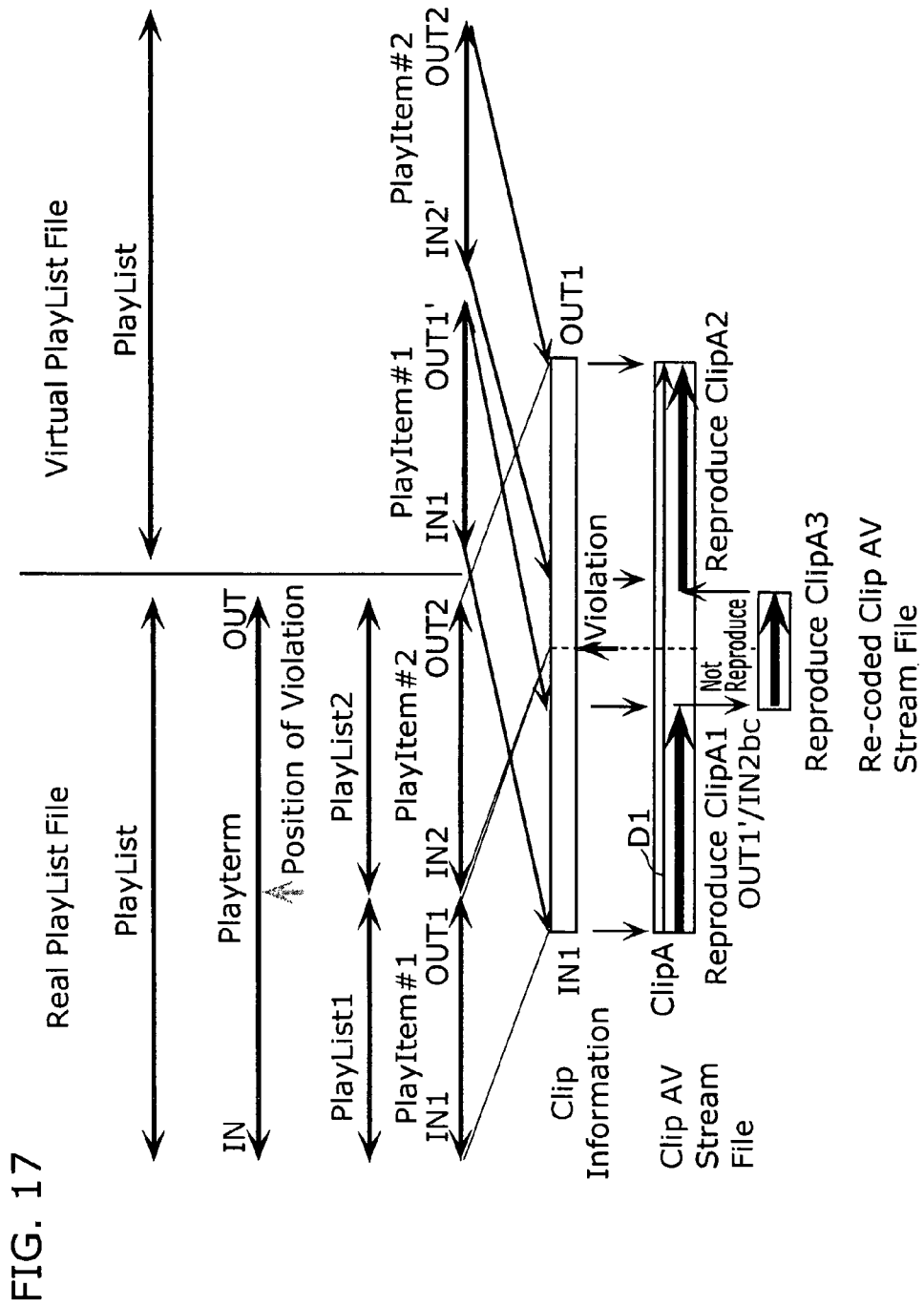
FIG. 17 is a diagram showing a use of a Bridge Clip function of a Virtual PlayList for seamlessly connecting a re-coded stream with another stream in order to be reproduced.

FIG. 17 is a diagram showing a use of the Bridge Clip function of the Virtual PlayList for seamlessly connecting a re-coded stream with another stream, in order to be reproduced. Here, it is assumed that a Clip AV stream, in a part of which standard violation or buffer restriction violation occurs, is video-recorded. Under the assumption, a Real PlayList for the Clip AV stream is originally made up of one PlayItem. When standard violation or buffer restriction violation occurs, the re-coding control unit 110 obtains information regarding coding control in the case of the violation. In addition to the information, time information and position information, which indicate when and where the violation stream is recorded onto the recording unit 120, are obtained from a time stamp and the TU_map regarding the packet at the time of the violation.

Then, based on the time information and the position information regarding the packet of the violation stream, the violation Clip AV stream is divided into a PlayList 1 and a PlayList 2, using a picture of the violation packet as a border. Thereby the PlayList 1 is a partial stream temporally from a start to the violation picture, and the PlayList 2 is a partial stream following the PlayList 1. Here, a starting point and an ending point of a PlayItem #1 of the PlayList 1 are set to IN1 and OUT1, respectively. Further, a starting point and an ending point of a PlayItem #2 of the PlayList 2 are set to IN2 and OUT2, respectively. Note that, in this case, the original video-recorded Clip, shown by a thin horizontal arrow D1 of Clip AV Stream file of FIG. 17, has no change.

The present invention is characterized in seamlessly connecting a re-coded stream for violation avoidance with a remaining normal stream (hereinafter, referred to also as a "non-re-coded stream"), using the Bridge Clip edit function of the Virtual PlayList. More specifically, a new clip (Clip A3 of FIG. 17), which is a part of a clip of the PlayItem #1 and has been re-coded to avoid violation, is used as a Bridge Clip in order to fill a gap between (i) the clip of the PlayItem #1 except the re-coded part (Clip A1 of FIG. 17) and (ii) a clip of the PlayItem #2 (Clip A2 of FIG. 17). Thereby, considering the Clip A1 as a Virtual PlayList file, a starting point and an ending point of the PlayItem #1 are set to IN1 and OUT1', respectively. Further, considering the Clip A2 also as a Virtual PlayList file, a starting point and an ending point of the PlayItem #2 are set to IN2' and OUT2, respectively. Here, a starting point of the Bridge Clip is IN2bc which is the same point as OUT1'. As shown by thick arrows of the Clip AV Stream file of FIG. 17, reproduction is performed in an order of ClipA1, ClipA3, and ClipA2, thereby seamlessly and consecutively reproducing the clips as a stream avoiding violation.

The following describes a method of generating the part of the clip which is to be re-coded to avoid violation. Firstly, a starting picture in a set of pictures (equivalent to a GOP) in a coded stream is assumed to be an IDR picture and coded. Note that, if an IDR picture is used, pictures following the IDR picture in the picture set are not able to refer to other pictures beyond the IDR picture.

FIG. 18 is a diagram for explaining the first example of the re-coding processing according to an aspect of the invention. FIG. 18 (*a*) shows a coded stream (Clip A) which is not yet re-coded, and also shows that the stream has standard violation. FIG. 18 (b) shows a situation where the Clip A is divided into a re-coded part (Clip A3) and non-re-coded parts (Clip A1 and Clip A2). Note that the dividing of the Clip A is not real, but only virtual. FIG. 18 (c) shows the re-coded clip and the non-re-coded clips in an actual stream order, in units of coded pictures. In FIG. 18, "I" represents an I picture, "P" represents a P picture, and "B" represents a B picture. A numeral attached to the above character represents an order of coding.

In FIG. 18, it is assumed that re-coding processing becomes necessary since violation occurs in a part of a B picture in the coded stream. In order to re-code a B picture, P or I pictures which are temporally adjacent to the B picture and positioned prior and subsequent to the B picture, are necessary as reference pictures. In FIG. 18 (c), a part of a picture B55 has violation, so that pictures P54 and P57 are necessary. Therefore, pictures from P54 to B56 are decoded, and pictures B55 and B56 are re-coded based on re-coding information.

Figure 19:
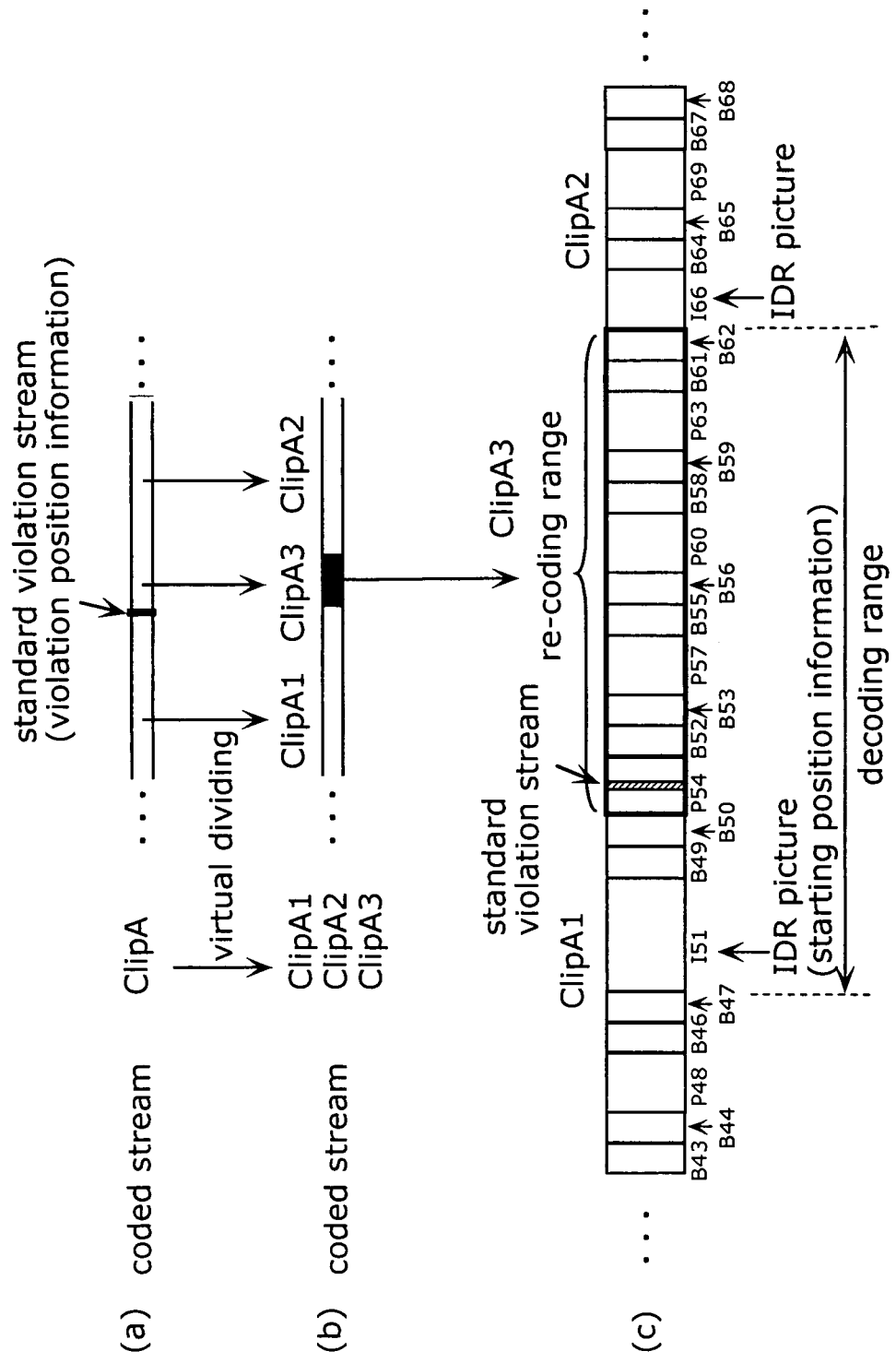
FIG. 19 is a diagram showing another example of the method for connecting a re-coded stream with another stream.

In FIG. 19, it is assumed that re-coding processing becomes necessary since violation occurs in a part of a P picture in the coded stream. In order to re-code a P picture, a P or I picture which is temporally subsequent to the P picture is necessary as a reference picture. In FIG. 19 (c), a part of a picture P54 has violation, so that a picture I51 is necessary. Here, if the picture P54 is changed by the re-coding, P and B pictures subsequent to the picture P54 are affected. Therefore, pictures from I51 to B62 are decoded, and pictures from B54 to B62 are re-coded based on re-coding information.

Figure 20:
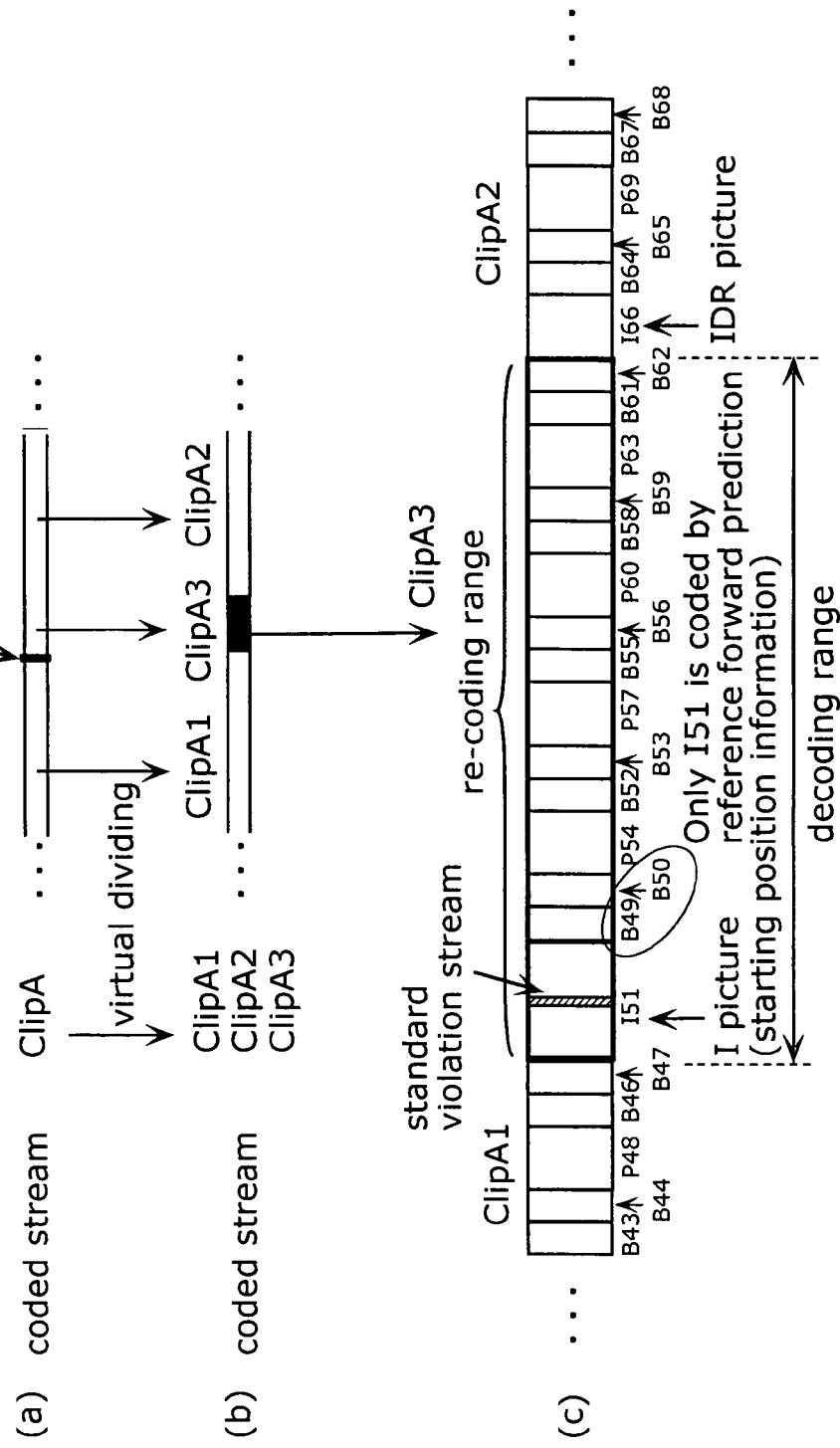
FIG. 20 is a diagram showing still another example of the method for connecting a re-coded stream with another stream.

In FIG. 20, it is assumed that re-coding processing becomes necessary since violation occurs in a part of an I picture in the coded stream. I picture is a picture subjected to intra-picture prediction coding using only the I picture itself, without referring to any reference pictures. If an I picture is re-coded, all pictures subsequent to the I picture are affected (until a next I picture). Therefore, as shown in FIG. 20 (c), if a part of a picture I51 has violation, pictures from I51 to B62 are decoded, and pictures from I51 to B62 are re-coded based on re-coding information.

Figure 21:
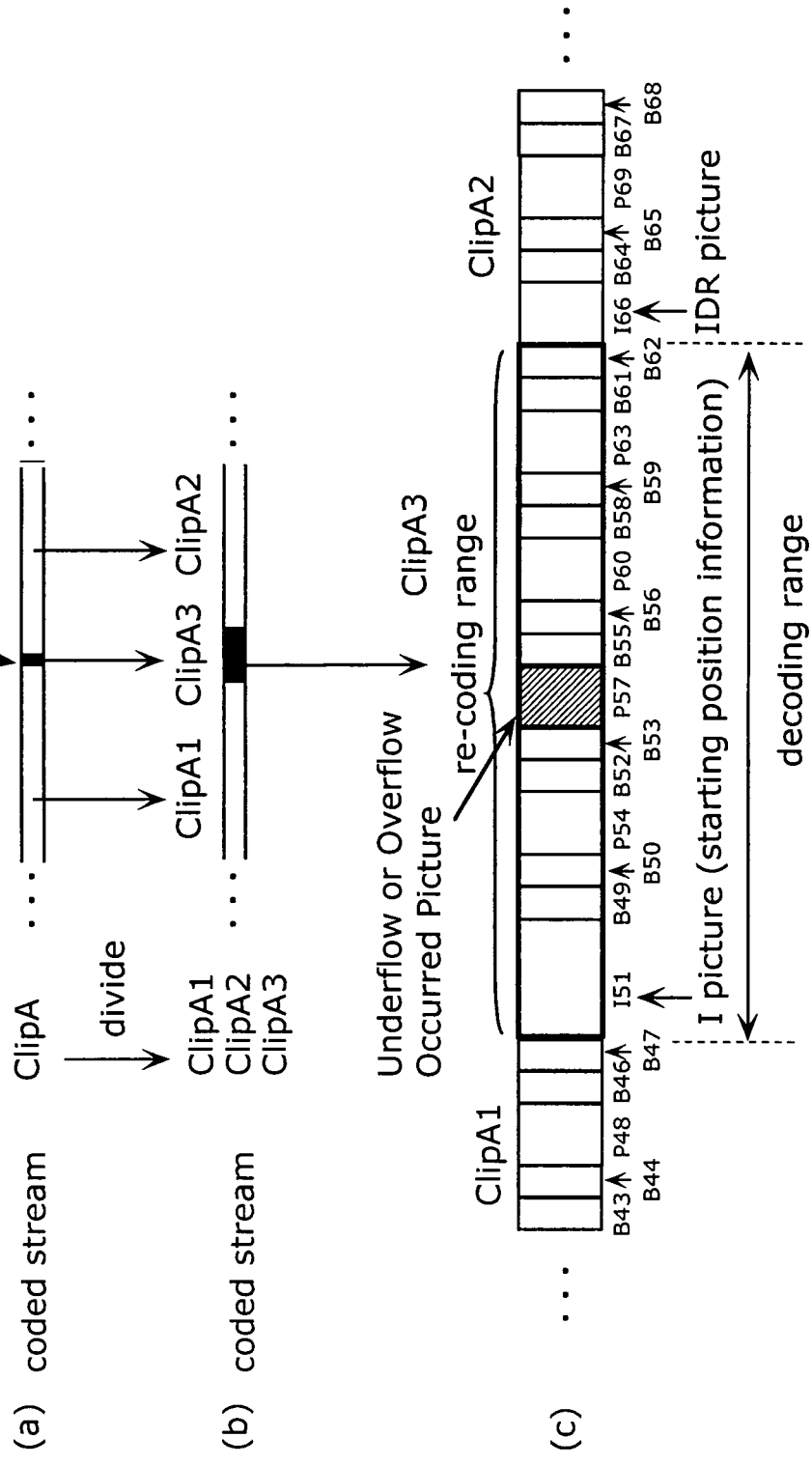
FIG. 21 is a diagram showing still another example of the method for connecting a re-coded stream with another stream.

FIG. 21 shows a situation where re-coding processing becomes necessary since overflow or underflow occurs. Here, it is assumed that overflow or underflow occurs in a picture P57. In this case, in order to prevent buffer breakdown, a set of pictures (equivalent to a GOP) including the picture P57 is decoded, and pictures from I51 to B62 are re-coded based on re-coding information.

Figure 22:
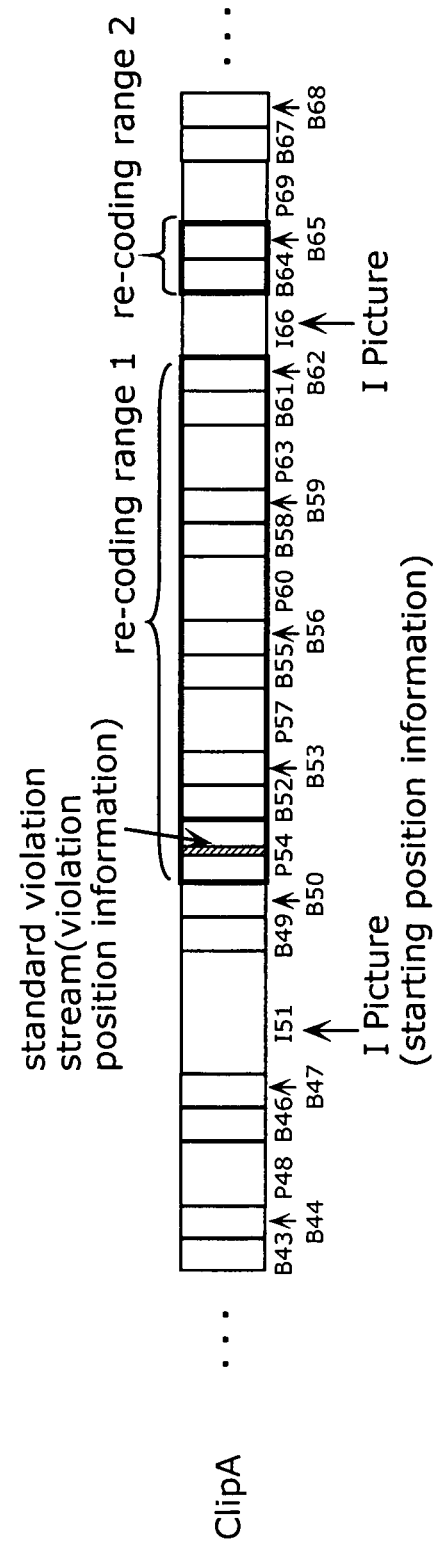
FIG. 22 is a diagram showing a problem occurred when a re-coded stream is connected with another stream.
Figure 23:
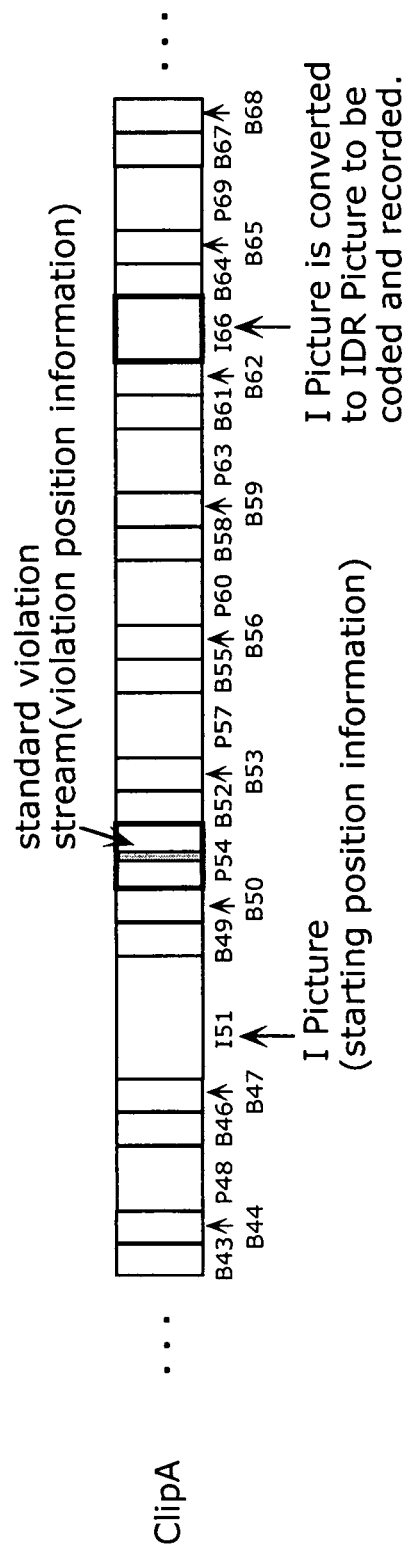
FIG. 23 is a diagram showing a method of solving the problem occurred when a re-coded stream is connected with another stream.

However, there is one problem in the re-coding processing. In the re-coding processing, it is assumed that the starting picture of the set of pictures (equivalent to a GOP) in the coded stream is an IDR picture. Here, as shown in FIG. 22, when a part of an I picture has violation, if I and P pictures are re-coded in the set of pictures (equivalent to a GOP) including the violation picture, this affects the first B pictures (B64 and B65 of FIG. 21) in a next GOP. In the above situation, clips are not dividing efficiently in units of GOPs. In order to address the problem, as shown in FIG. 23, if violation occurs in a coded stream, (i) a GOP next to the violation stream is coded, by changing a starting I picture of the GOP to an IDR picture, or (ii) the GOP is coded as a closed GOP which does not have reference relationship with any other GOPs.

Figure 24:
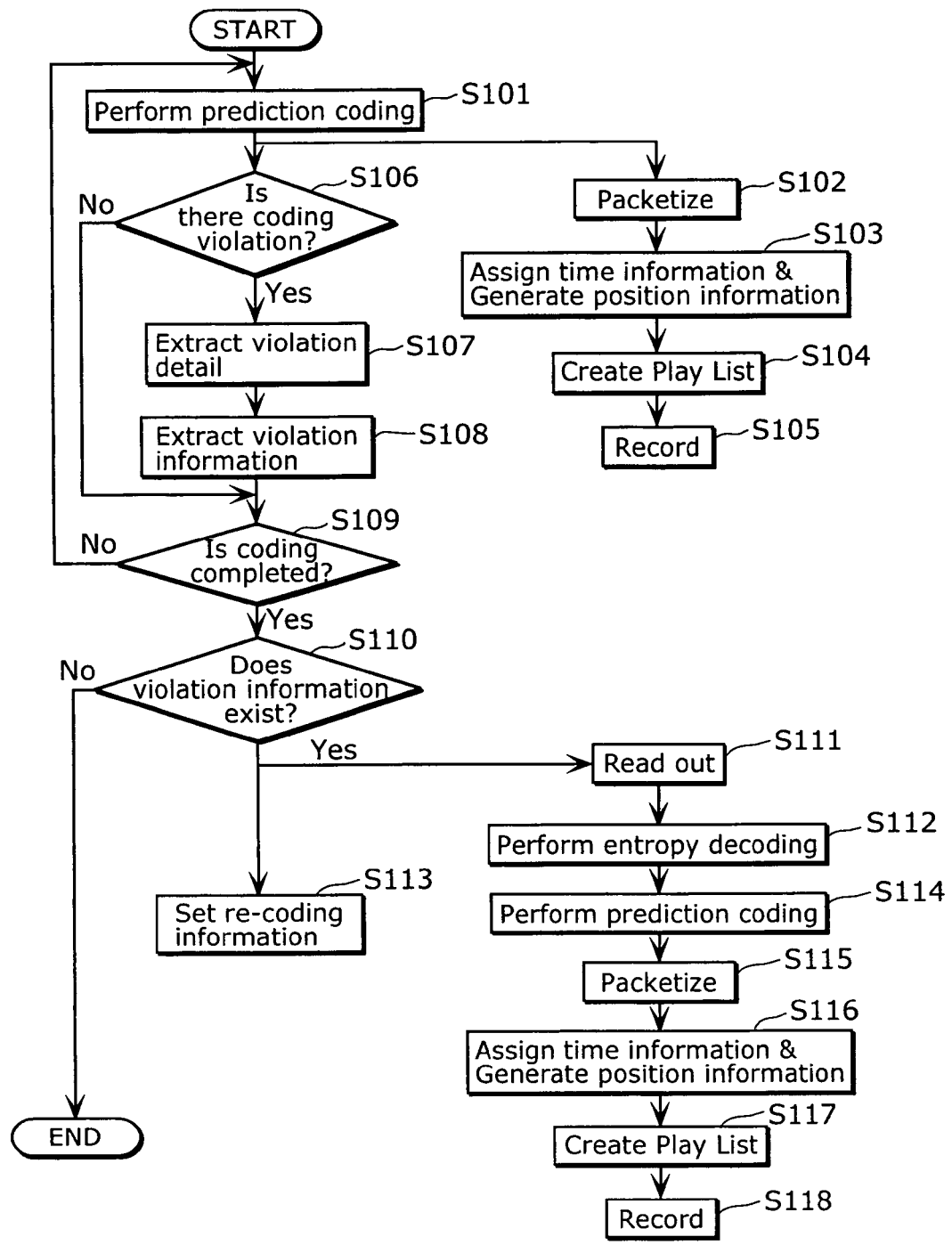
FIG. 24 is a flowchart showing processing performed by the image coding/recording apparatus according to an embodiment of the invention.

FIG. 24 is a flowchart showing processing performed by the image coding/recording apparatus according to an embodiment of the invention. The following describes processing regarding the re-coding when coding violation occurs with reference to the flowchart of FIG. 24.

Firstly, video signals inputted in the prediction coding unit 100 are compressed, and then entropy-coded by the CABAC (Step S101). The coded data (coded stream) is divided into predetermined recording/transmitting units, for example, into packets (Step 102). The packets are counted by a clock count, and a header of each packet is assigned with time information (a time stamp, for example). Further, a byte amount of the coded data is calculated using the time information and a period from video-recording starting time. Furthermore, position information (TU_map, for example) used to access the coded stream at random is generated using position information of a starting packet in a group of independent pictures (equivalent to a GOP, for example) (Step S103). A series of consecutive video-recorded data is managed as a PlayList file (Step S104). The PlayList file is recorded onto the recording unit 120 in association with a real coded stream file (a clip file made up of a Clip AV Stream file and a Clip Information files storing TU_map and the like).

On the other hand, while obtaining information from the entropy coding unit 17 and the rate control unit rate 26 of the prediction coding unit 100, the determination unit 111 of the re-coding control unit 110 determines whether or not the coded stream outputted from the prediction coding unit 100 has coding violation, for example, whether or not a coding amount of a mackroblok exceeds the 3200-bit maximum MB coding amount, or whether or not CPB buffer restriction is satisfied (Step S106). If a determination is made that such coding violation occurs (Yes at Step S106), then violation detail of the coding violation (for example, exceeding over the maximum MB coding amount, or underflow or overflow of buffer) and coding information in the case of the violation (information regarding coding, such as a picture, a macroblock, a quantization value, an available capacity of a buffer, and the like, in the case of the violation) are extracted (Step S107). If a determination is made that no coding violation occurs (No at Step S106), then the processing proceeds to Step S109.

As mentioned above, if a determination is made that the coding violation occurs (Yes at Step 106), the violation detail and the coding information are extracted. Then, the violation information is also extracted (Step S108). The violation information includes position information indicating where the coding violation data (violation coded stream) is written on the recording unit 120, in addition to the violation detail and the coding information. The violation information is used to create a PlayList for writing re-coded data onto the recording unit 110 after the determination of the next Step S109 (Step S117). Then, this violation information is temporarily held into a memory buffer of the recording apparatus or into the recording unit 120 (Step S108).

After extracting the violation information at Step S108, it is determined whether or not further violation exists, by checking whether or not coding (video-recording) is completed (Step S109). If it is determined that the coding or video-recording is still being executed (No at Step S109), then the processing returns to Step S101. On the other hand, if it is determined that the coding or video-recording is completed (Yes at Step S109), then it is further determined whether or not there is violation information held temporarily (Step S110). If there is no such violation information held (No at Step S110), then the processing is completed.

On the other hand, if there is the violation information held (Yes at Step S110), then based on the violation information, the coding violation stream and a series of streams related to the violation stream are read out from the recording unit 120 (Step S111). Moreover, the violation information is sent to the control unit 113, and re-coding information for avoiding the coding violation is set (Step s113). The re-coding information differs depending on violation details, and is set based on the held coding control information in the case of the violation.

The streams which have been read out from the recording unit 120 at Step S111 are decoded by the entropy decoding unit 130 (step S112). The entropy-decoded compressed data is provided to the prediction coding unit 100, and re-coded by the prediction coding unit 100 using the re-coding information obtained at Step S113 (Step S114).

The re-coded data is packetized in the same manner as at Step 102 or Step 103 (Step S115), and time information is assigned and position information is generated (Step S116). Note that at Step S116, information is obtained from the re-coding information of Step 113. The obtained information is used to set a starting IN point and an ending OUT point of the position information of the re-coded stream, so that the re-coded stream can be inserted as a Clip AV stream temporally connected with non-re-coded stream Clips.

Time information and position information of the re-coded stream are obtained (Step S116), and position information of clips of the non-re-coded streams are obtained from the recording unit 120 (Step S111). Then, a PlayList is created, so that, as a Virtual PlayList file, a clip of the re-coded stream is able to be virtually inserted, as a Bridge Clip, between clips of the non-re-coded streams, and that these clips are able to be consecutively reproduced (Step S117).

After the above-mentioned packetizing, (i) the re-coded stream assigned with the time information and (ii) the PlayList file in which the re-coded stream is generated as the Bridge Clip are recorded onto the recording unit 120 (Step S118).

As described above, according to the image coding/recording apparatus of an embodiment of the invention, it is not necessary to perform the general coding and the re-coding at the same time, which makes it possible to solve problems of large processing loads due to the real-time re-coding and problems of complicated controls and circuits for the processing-returning.

Furthermore, it is possible to connect the re-coded data, as a Bridge Clip file in a Virtual Playlist which is a virtual edit function of a Blu-ray Disk, with non-re-coded data, so that it is possible to realize seamless reproduction.

Note that, in the above description, the BD-RE is used as one example of the recording medium, but the recording medium is not limited to the BD-RE. Other recording mediums, such as hard disks, semiconductor memories, optical disks, and the like are also able to be applied in the present invention in the same manner as described above for the BD-RE. More specifically, it is possible to temporarily record coded streams including the violation stream onto such a recording medium, then to re-code the violation stream to be a normal stream, and to connect the re-coded normal stream with non-re-coded streams. Here, the violation information, the coding information in the case of the violation, the position information indicating where the violation stream is recorded are held. These information may be held in the recording medium on which the streams are recorded, or in a temporal memory of the image coding/recoding apparatus. If the BD-RE is used as the recording medium, these information may be recorded in a gathered file region which is a region for holding PlayList files, Clip Information files, and the like.

Note that, depending on the situation, there is a special case where the coded stream recorded on the recording medium is not able to be decoded. In such a case, since the re-coding itself is impossible, a stream equivalent to a GOP including a violation stream is generated as a dummy clip file, after determining that decoding is impossible. For example, recently-decoded pictures are coded to be repeatedly reproduced for the GOP, or grey dummy coded picture data are previously generated. Thereby, even if the coded stream recorded on the recording medium is not able to be decoded, it is possible to prevent video images from being distorted.

Although only exemplary embodiment of the invention has been described in detail above, those skilled in the art will be readily appreciate that many modifications are possible in the exemplary embodiment without materially departing from the novel teachings and advantages of the invention. Accordingly, all such modifications are intended to be included within the scope of the invention.

INDUSTRIAL APPLICABILITY

The invention is suitable for digital video cameras, portable telephones with camera function, BD/DVD recording/reproducing apparatuses, hard disk recorders, PDAs, personal computers, and the like, which need to solve problems of large processing loads due to the real-time re-coding and problems of complicated controls and circuits for processing-returning.

What is claimed is:

1. An image coding and recording apparatus which codes and records image data based on a predetermined coding standard, said apparatus comprising:
    a coding unit operable to (i) code the image data on a block-by-block basis defined by the predetermined coding standard so as to generate a first coded stream, and (ii) re-code, after decoding at least one block in the first coded stream, the at least one block so as to generate a second coded stream different from the first coded stream;
    a recording unit operable to record the first coded stream generated by said coding unit; and
    a re-coding control unit operable to obtain a violation block from the first coded stream recorded by said recording unit, the violation block being a block having a coding amount exceeding a maximum coding amount defined by the predetermined coding standard,
    wherein said coding unit is operable to:
        (i) even when the violation block occurs in the coding of the image data, complete the coding of the image data without re-coding the violation block so as to generate the first coded stream including the violation block; and
        (ii) when said re-coding control unit obtains the violation block from the first coded stream recorded by said recording unit, re-code partial data including at least the violation block in the first coded stream, and generate the second coded stream including only one or more blocks each having a coding amount smaller than the maximum coding amount defined by the predetermined coding standard, and
    wherein said recording unit is configured to:
        (i) record the second coded stream together with the first coded stream; and
        (ii) record control information defining that the second coded stream is reproduced, in a process of reproducing the first coded stream, instead of the partial data during reproduction the partial data.

2. The image coding and recording apparatus according to claim 1,
    wherein said re-coding control unit includes:
        a determination unit operable to determine whether or not the violation block occurs in the coding of the image data; and a violation information extraction unit operable to extract violation information when it is determined that the violation block occurs in the coding of the image data, the violation information being information regarding the violation block, and wherein said coding unit re-codes the partial data based on the violation information.

3. The image coding and recording apparatus according to claim 1, wherein said re-coding control unit includes:

a determination unit operable to determine whether or not the violation block occurs in the coding of the image data;

a violation information extraction unit operable to extract violation information when it is determined that the violation block occurs in the coding of the image data, the violation information being information regarding the violation block;

a violation information recording unit operable to record and hold the violation information extracted by said violation information extraction unit, and wherein said coding unit re-codes the partial data based on the violation information which is recorded and held by said violation information recording unit.

4. The image coding and recording apparatus according to claim 2, wherein the violation information includes (i) position information indicating where the first coded stream is recorded by said recording unit, (ii) violation detail indicating that violation block occurs in the coding the image data, and (iii) coding information.

5. The image coding and recording apparatus according to claim 4, wherein said coding unit re-codes the partial data by setting a quantization value of the partial data to a greater value.

6. The image coding and recording apparatus according to claim 1, wherein said re-coding control unit is operable to control said recording unit to record the second coded stream as a Bridge Clip file of a Virtual PlayList which is a virtual edit function of a Blu-ray Disk.

7. The image coding and recording apparatus according to claim 1, wherein said coding unit codes a group of independent pictures, by changing an I picture to an Instantaneous Decoding Refresh (IDR) picture in the group immediately following a stream in which violation occurs when it is determined that the violation block occurs in the coding the image data and the I picture is a starting picture in the group.

8. The image coding and recording apparatus according to claim 1, wherein said coding unit re-codes the partial data when a series of the coding and recoding processing is stopped or completed.

9. The image coding and recording apparatus according to claim 1, wherein the control information (i) indicates the second coded stream as a Bridge Clip file, and (ii) indicates a first Clip file, a second Clip file, and the Bridge Clip file so that the first Clip file, the Bridge Clip file, and the second Clip file are consecutively reproduced, the first Clip file being reproduced before the partial data in the first coded stream and the second Clip filed being reproduced after the partial data in the first coded stream.

10. An image coding and recording method of coding and recording image data based on a predetermined coding standard, said method comprising:

coding the image data on a block-by-block basis defined by the predetermined coding standard so as to generate a first coded stream;

recording the first coded stream generated in said coding;

re-coding, after decoding at least one block in the first coded stream, the at least one block so as to generate a second coded steam different than the first coded stream; and obtaining a violation block from the first coded stream recorded during said recording, the violation block having a coding amount exceeding a maximum coding amount defined by the predetermined coding standard, wherein said coding includes, even when the violation block occurs in the coding of the image data, completing the coding of the image data without re-coding the violation block so as to generate the first coded stream including the violation block, and wherein said re-coding includes, when said obtaining obtains the violation block from the first coded stream recorded by said recording, re-coding partial data including at least the violation block in the first coded stream, and generating the second coded stream including only one or more blocks each having a coding amount smaller than the maximum coding amount defined by the predetermined coding standard, and wherein image coding and recording method further comprises:

recording the second coded stream together with the first coded stream; and recording control information defining that the second coded stream is reproduced, in a process of reproducing the first coded stream, instead of the partial data during reproduction of the partial data.

11. The image coding and recording method according to claim 10, wherein said obtaining includes:

determining whether or not the violation block occurs in said coding; and extracting violation information when it is determined that the violation block occurs in said coding, the violation information being information regarding the violation block, and wherein said re-coding re-codes the partial data based on the violation information.

12. The image coding and recording method according to claim 10, wherein said obtaining includes:

determining whether or not the violation block occurs in said coding;

extracting violation information when it is determined that the violation block occurs in said coding, the violation information being information regarding the violation block; and recording and holding the extracted violation information, and wherein said re-coding re-codes the partial data based on the recorded and held violation information.

13. The image coding and recording method according to claim 11, wherein the violation information includes (i) position information indicating where the first coded stream is recorded in said recording of the first coded stream, (ii) violation detail indicating that the violation block occurs in said coding, and (iii) coding information.

14. The image coding and recording method according to claim 13,
   wherein the partial data is re-coded by setting a quantization value of the partial data to a greater value.

15. The image coding and recording method to claim 10,
   wherein the second coded stream is recorded as a Bridge Clip file of a Virtual PlayList which is a virtual edit function of a Blu-ray Disk.

16. The image coding and recording method according to claim 10,
   wherein a group of independent pictures is coded by changing an I picture to an Instantaneous Decoding Refresh (IDR) picture in the group immediately following a stream in which violation occurs when it is determined that the violation block occurs in said coding and the I picture being a starting picture in the group.

17. The image coding and recording apparatus according to claim 10,
   wherein the partial data is re-coded when a series of the coding and recoding processing is stopped or completed.

18. An integrated circuit for use in an image coding and recording apparatus which codes and records image data based on a predetermined coding standard, said integrated circuit comprising:
   a coding unit operable to (i) code the image data on a block-by-block basis defined by the predetermined coding standard so as to generate a first coded stream, and (ii) re-code, after decoding at least one block in the first coded steam, the at least one block so as to generate a second coded stream different from the first coded stream;
   a recording unit operable to record the first coded stream generated by said coding unit; and
   a re-coding control unit operable to obtain a violation block from the first coded stream recorded by said recording unit, the violation block being a block having a coding amount exceeding a maximum coding amount defined by the predetermined coding standard,
   wherein said coding unit is operable to:
      (i) even when the violation block occurs in the coding of the image data, complete the coding of the image data without re-coding the violation block so as to generate the first coded stream including the violation block; and
      (ii) when said re-coding control unit obtains the violation block from the first coded stream recorded by said recording unit, re-code partial data including at least the violation block in the first coded stream, and generate the second coded stream including only one or more blocks each having a coding amount smaller than the maximum coding amount defined by the predetermined coding standard, and
   wherein said recording unit is configured to:
      (i) record the second coded stream together with the first coded stream; and
      (ii) record control information defining that the second coded stream is reproduced, in a process of reproducing the first coded stream, instead of the partial data during reproduction of the partial data.

19. The integrated circuit according to claim 18,
   wherein said re-coding control unit includes:
      a determination unit operable to determine whether or not the violation block occurs in the coding of the image data; and
      a violation information extraction unit operable to extract violation information from said recording unit when it is determined that the violation block occurs in the coding of the image data, the violation information being information regarding the violation block, and
   wherein said coding unit re-codes the partial data based on the violation information.

* * * * *